US008812752B1

(12) United States Patent
Shih et al.

(10) Patent No.: US 8,812,752 B1
(45) Date of Patent: Aug. 19, 2014

(54) CONNECTOR INTERFACE FOR DATA PIPELINE

(71) Applicant: Amazon Technologies, Inc., Reno, NV (US)

(72) Inventors: Kathryn Marie Shih, Seattle, WA (US); Eider Brantly Moore, Seattle, WA (US); Richard Rex McKnight, Mountain View, CA (US); Vaibhav Aggarwal, Bellevue, WA (US); Peter Sirota, Seattle, WA (US); Richard Jeffrey Cole, Seattle, WA (US); James P. Bartlett, Seattle, WA (US); Carl Louis Christofferson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/764,711

(22) Filed: Feb. 11, 2013

Related U.S. Application Data

(60) Provisional application No. 61/738,967, filed on Dec. 18, 2012.

(51) Int. Cl.
*G06F 3/00* (2006.01)
*G06F 9/44* (2006.01)

(52) U.S. Cl.
USPC .......................................... 710/29; 717/109

(58) Field of Classification Search
None
See application file for complete search history.

(56) References Cited

U.S. PATENT DOCUMENTS

2005/0149908 A1* 7/2005 Klianev ..................... 717/109

OTHER PUBLICATIONS

Alejandro Abdelnur, "Oozie Specification, a Hadoop Workflow System," Oct. 8, 2010, retrieved from http://rvs.github.com/oozie/releases/2.2.1/WorkflowFunctionalSpec.html on Feb. 11, 2013. pp. 1-37.
Anil Pillai and Alejandro Abdelnur, "Oozie Coordinator Specification," Oct. 8, 2010., retrieved from http://rvs.github.com/oozie/releases/2.2.1/CoordinatorFunctionalSpec.html on Feb. 11, 2013. pp. 1-43.
"Oozie—Design," retrieved from http://rvs.github.com/oozie/design.html on Feb. 11, 2013. pp. 1-2.
"Quartz Scheduler 2.1.x Documentation," retrieved from http://quartz-scheduler.org/files/documentation/Quartz-2.1.x-Documentation.pdf on Feb. 11, 2013. pp. 1-140.
U.S. Appl. No. 13/764,716, filed Feb. 11, 2013, Kathryn Marie Shih et al.

* cited by examiner

*Primary Examiner* — Hyun Nam
(74) *Attorney, Agent, or Firm* — Robert C. Kowert; Meyertons, Hood, Kivlin, Kowert & Goetzel, P.C.

(57) ABSTRACT

Methods and systems for a connector interface in a data pipeline are disclosed. A pipeline comprising two data source nodes and an activity node is configured. Each data source node represents data from a different data source, and the activity node represents a workflow activity that uses the data as input. Two connectors which implement the same connector interface are triggered. In response, data is acquired at each connector from the corresponding data source through the connector interface. The data is sent from the connectors to the activity node through the connector interface. The workflow activity is performed using the acquired data.

20 Claims, 13 Drawing Sheets

CONNECTOR INTERFACE FOR DATA PIPELINE

PRIORITY INFORMATION

This application claims benefit of priority of U.S. Provisional Application Ser. No. 61/738,967 entitled "SCHEDULER AND CONNECTOR INTERFACE FOR DATA PIPELINE" filed Dec. 18, 2012, the content of which is incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, thus allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

In many environments, operators of provider networks that implement different types of virtualized computing, storage, and/or other network-accessible functionality allow customers to reserve or purchase access to resources in any of several different resource acquisition modes. For example, a customer may reserve a virtual compute resource instance for a relatively long duration, such as one year or three years, or a customer may purchase resources for shorter terms on an ad-hoc basis as needed. For some types of resource reservations, at least a portion of the price paid by the customer may fluctuate over time in response to changing demand and supply of the resources within the provider network. The provider network operator may seek to ensure that a number of potentially competing demands are met, e.g., that all guaranteed commitments to clients (such as long-term reservations that have already been paid for) are honored, that the dynamically-varying component of resource pricing does not get so high that customer satisfaction suffers, that the provider's data center investment is justified by a reasonable level of resource utilization and revenue, and so on. Depending on customer budgets, at least for certain types of typically long-running applications for which the major constraint is that the application should ideally be completed before some relatively distant deadline, some customers may be willing to allow the network provider operator flexibility in determining exactly which resources are deployed and when, especially in return for pricing benefits.

Figure 1A:
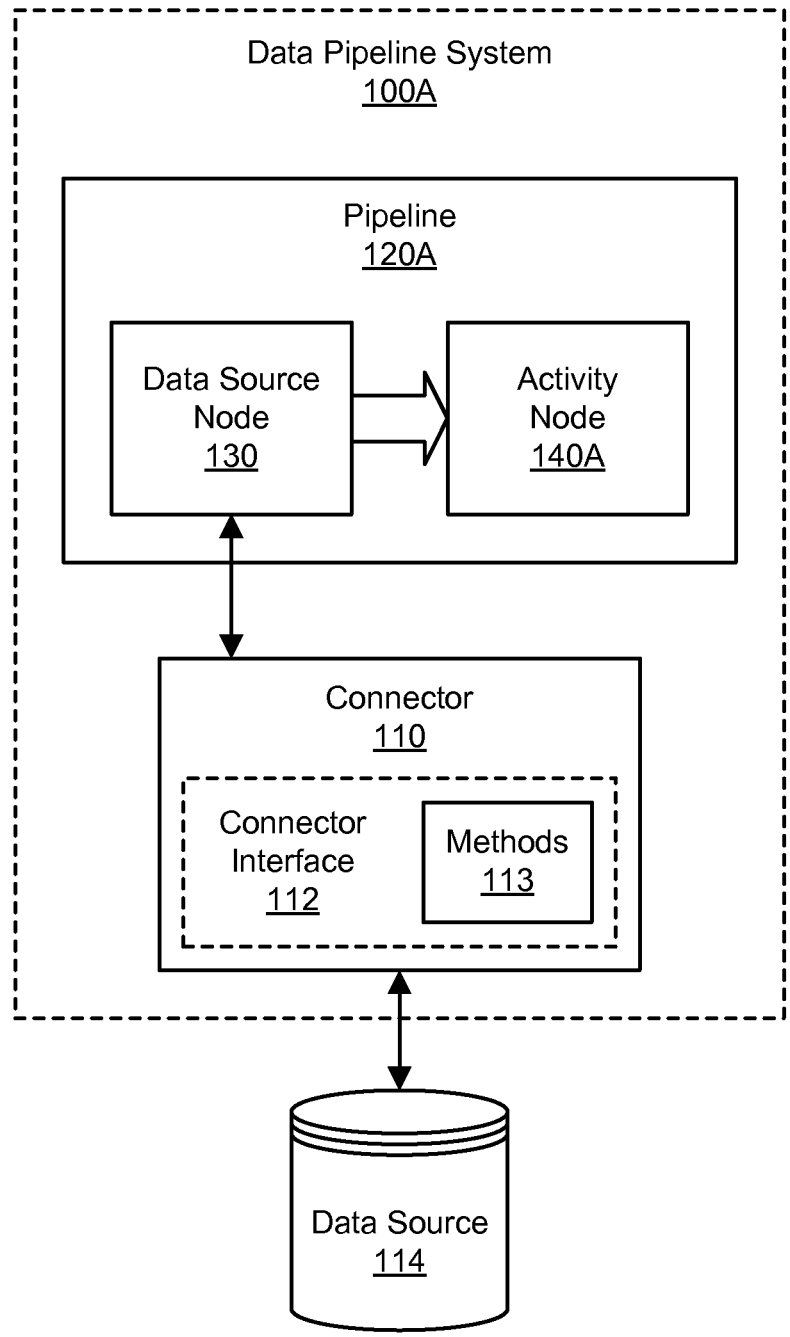
FIGS. 1A, 1B, and 1C illustrate example system environments for a connector interface in a data pipeline, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems associated with a data pipeline are described. Using the systems and methods described herein, a defined workflow, also referred to as a pipeline, may include nodes that are configured to obtain data, perform data manipulation operations, and output or store data. In some embodiments, data source nodes may obtain data from particular data sources through connectors that implement a generic connector interface. In some embodiments, a scheduler associated with the data pipeline may allow users to schedule large numbers of periodic tasks. The tasks may have complex inter-task dependencies. The scheduler may be multi-threaded, and decisions made by the scheduler may be distributed among different computing devices and/or software processes.

In various embodiments, a data pipeline may provide one or more services allowing users to schedule and manage data-driven workflows. In some embodiments, the data pipeline may provide clients with access to functionality for creating, configuring, and executing defined workflows that manipulate source data in defined manners, such as under the control of a configurable workflow service that is available to multiple remote clients. In at least some embodiments, a remote client may interact with a configurable workflow service over one or more public networks in order to create and configure a defined workflow that is provided by the configurable workflow service for use by the client. Such a defined workflow may, for example, include multiple interconnected workflow components that are each configured to perform one or more specified types of data manipulation operations on a specified type of input data. After a client has configured such a defined workflow, the configurable workflow service may further execute the defined workflow at one or more times and in one or more manners, such as in some situations by provisioning multiple computing nodes provided by the configurable workflow service to each implement at least one of the workflow components for the defined workflow, and by retrieving defined types of source data and providing it to workflow components in defined manners. Thus, in at least some embodiments, some or all of the described techniques are automatically performed by embodiments of a configurable workflow service, such as may be implemented by one or more software modules executing on one or more configured computing systems, as described in greater detail below.

As noted above, a defined workflow may include multiple workflow components, which may be of multiple types in at least some embodiments, including one or more data source workflow components that correspond to input data for the defined workflow, one or more data manipulation workflow components that correspond to defined data transformations or other manipulations to be performed on data, and one or more data destination workflow components that correspond to providing output data from the defined workflow. In addition, interconnections may be defined between workflow components that correspond to data flows between workflow components, such that data output from a first component may be supplied as input to a second component, with that relationship being represented as a connection from the first component to the second component. In at least some embodiments and situations, the configurable workflow service may provide a group of predefined workflow components that a client may select and use in a defined workflow of the client, optionally after being configured in one or more manners. Furthermore, in at least some embodiments and situations, the configurable workflow service may enable a client to supply or otherwise define some or all workflow components to be used in a defined workflow of the client.

Each data source workflow component that is defined for a workflow may correspond to data obtained from an indicated data source, and each component may include information such as a storage location for the data and optionally additional access information related to the storage location (e.g., login information associated with the client, a particular search or other information to use to identify data to be used, such as metadata and/or data contents, etc.). In some embodiments, the configurable workflow service may provide internal storage locations for use by clients in storing their source data, with a particular data source corresponding to such an internal storage location, while in other embodiments and situations, a particular data source may be external to the configurable workflow service, such as one or more network-accessible storage systems that are provided by or otherwise controlled by the client, one or more online storage services, one or more online data generation services, etc. A non-exclusive list of examples of online storage services that may be used include the following: Amazon Simple Storage Service (S3) that stores object data of various types, Amazon Relational Database Service (RDS) that provides relational database functionality, Amazon SimpleDB that provides database functionality to store key-value pairs, Amazon DynamoDB service that provides NoSQL database functionality, Amazon Elastic Block Store (EBS) that provides access to raw block storage devices (e.g., mounting a virtual local block storage device on a target computer system), etc. A non-exclusive list of examples of online data generation services includes an RSS feed, the Amazon Cloudwatch Service that provides monitoring functionality for executing applications and services and generates corresponding information, etc. Data sources may thus be of various forms, such as a relational or other database (e.g., the HBase open-source distributed database, the BigTable distributed database, the MongoDB database system, the Apache Cassandra distributed database management system, etc.), a hash table, a file system, an object store, etc., optionally implemented in a distributed manner. A non-exclusive list of examples of data groups that may be obtained from a data source includes a file (e.g., a web server log), a database row or other record, a stored data object, a streamed group of data, etc.

Thus, in some situations and embodiments, a particular defined workflow may obtain and use data from multiple data sources, with some or all of the data sources optionally being external to the configurable workflow service. In addition, the configurable workflow service may optionally predefine one or more types of data source workflow components, such as to correspond to a particular internal storage mechanism of the configurable workflow service, to correspond to one or more particular online storage services (e.g., online storage services that are integrated with or otherwise affiliated with the configurable workflow service, or that instead are unaffiliated with the configurable workflow service), etc. Similarly, a client may optionally define one or more data source workflow components, such as to correspond to a client-specific storage location, to an online storage service without a predefined data source workflow component, etc.

Each data manipulation workflow component that is defined for a workflow may correspond to one or more defined data transformations or other manipulations on data that is input to the data manipulation workflow component. In addition, the output from a data manipulation workflow component may be provided to a data destination workflow component (and thus to be provided to a client), or instead may be intermediate data that is provided to a next data manipulation workflow component, such as via one or more electronic messages, by storing the intermediate data in a storage location accessible to the next data manipulation workflow component (e.g., using one or more storage locations provided by the configurable workflow service). Defined data manipulations may be of various forms, including a defined type of calculation on one or more groups of input data, aggregation of multiple groups of input data in one or more manners, selection of a subset of one or more groups of input data, moving data from one storage location to another, etc. A non-exclusive list of example data manipulations includes performing a distributed data copy, performing one or more SQL (Structured Query Language) transforms, performing one or more map and/or reduce functions within a map-reduce architecture (e.g., for use within the Amazon Elastic MapReduce service), using a scientific or mathematics package (e.g., MatLab, Mathematica, etc.), executing a client-supplied script or other program, etc. Thus, in some situations and embodiments, a particular defined workflow may perform multiple data manipulation operations via multiple defined data manipulation workflow components, using pre-defined and/or client-defined data manipulation workflow components.

Each data destination workflow component that is defined for a workflow may correspond to output data provided from the defined workflow to one or more storage locations and in one or more manners. The types of storage locations used by data destination workflow components (and corresponding information stored for such data destination workflow components) may be similar to or the same as for data source workflow components in at least some embodiments, including storage locations that are internal to and/or external from the configurable workflow service. In addition, in at least some embodiments and situations, particular data destination workflow components may include operations to prepare and/or provide output data in a particular manner, such as by generating particular types of reports, by sending output data via one or more types of defined electronic communications, etc. Thus, in some situations and embodiments, a particular defined workflow may provide multiple types of output data in multiple manners via multiple defined data destination workflow components, using predefined and/or client-defined data destination workflow components.

Figure 7A:
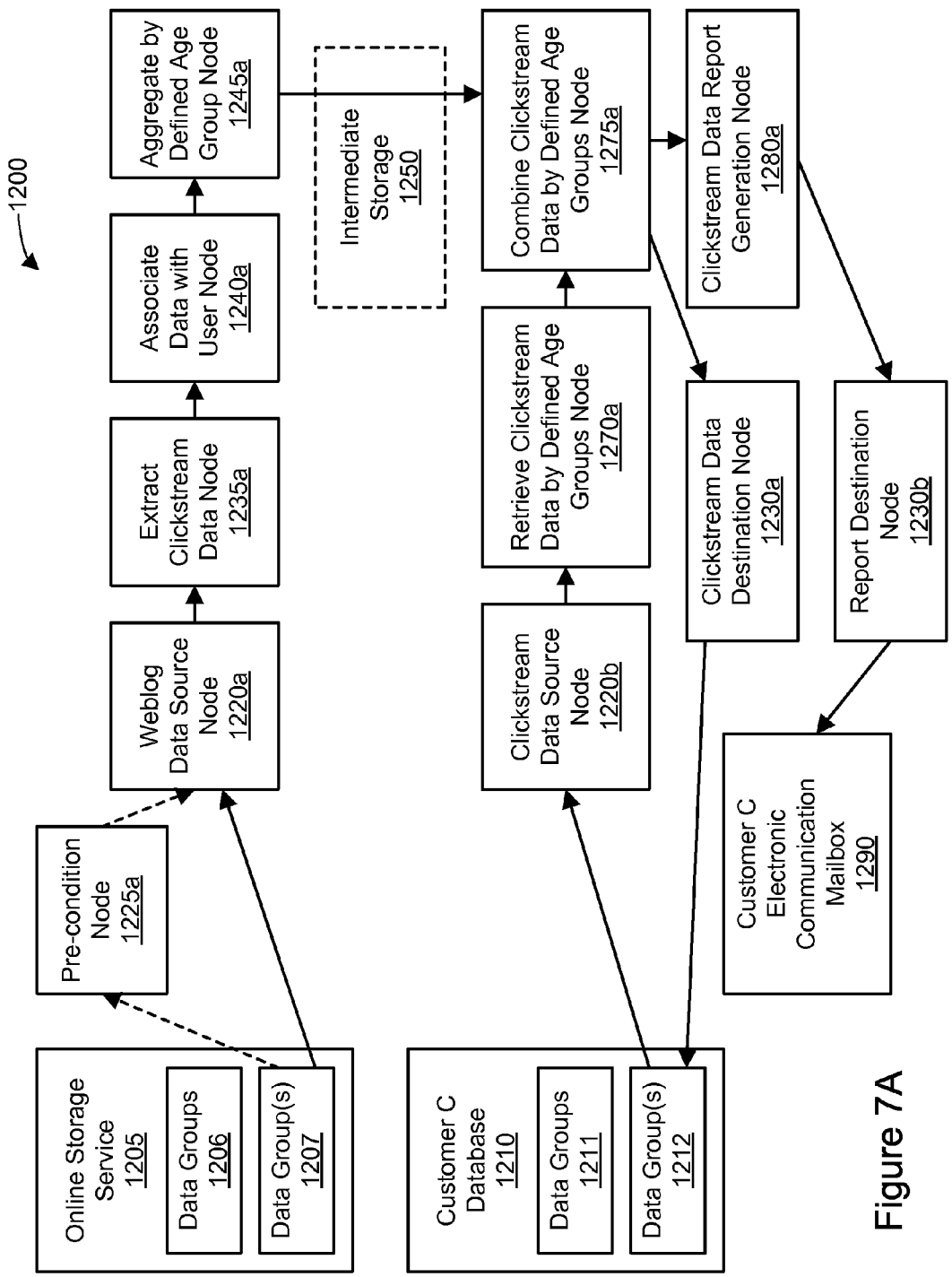
FIGS. 7A and 7B illustrate examples of techniques for using a defined workflow to manipulate source data in particular manners in particular situations, according to one embodiment.

In addition, a client may define a workflow in various manners in various embodiments. For example, an embodiment of a configurable workflow service may provide one or more interfaces for use by a client, such as a defined GUI ("graphical user interface"), a defined API ("application programming interface"), and/or a defined CLI ("command line interface"). When using a provided GUI, a user representative of a client may, for example, use a visual editor to specify particular workflow components for a workflow being defined, and may further specify interconnections between particular workflow components corresponding to data flows. In at least some such embodiments, the configurable workflow service may represent the defined workflow as a graph that logically represents the workflow, with various graph nodes corresponding to particular workflow components. FIG. 7A provides additional illustrative details with respect to an example of such a workflow graph.

The configurable workflow service may further implement a defined workflow for a client in various manners and at various times. In some embodiments, each time that a defined workflow is to be used, the configurable workflow service instantiates a physical copy of the logical graph representing the defined workflow, such as by using multiple computing nodes that each implement at least one workflow component for the defined workflow. In particular, in at least some embodiments, some or all of the computing nodes are provisioned by the configurable workflow service to implement particular workflow components (e.g., to load corresponding software and/or data on those computing nodes), such as to each execute a workload worker process corresponding to each such implemented workflow component. The computing nodes may have various forms in at least some embodiments, including a separate physical computer system, a separate virtual machine (e.g., one of multiple virtual machines hosted on a physical computer system), a group of multiple physical computer systems that are operating in a distributed manner, etc. Some or all such computing nodes used for a defined workflow may in some embodiments be selected from a plurality of computing nodes provided by the configurable workflow service for use by clients. In addition, some or all such computing nodes may be provided by or otherwise controlled by the client and/or may be provided by one or more online execution services, whether instead of or in addition to computing nodes provided by the configurable workflow service. A non-exclusive list of example online execution services that may be used include the Amazon Elastic Compute Cloud ("EC2") program execution service, the Amazon Elastic MapReduce service for performing distributed map-reduce operations (e.g., by using a cluster of computing systems from the service to represent or implement a computing node for the configurable workflow service), etc. In addition, when a particular defined workflow is to be implemented multiple times, the configurable workflow service may in some embodiments maintain the provisioning and availability of some or all computing nodes for the defined workflow between two or more such times (e.g., in accordance with instructions from the client, based on an automated determination by the configurable workflow service, etc.). In other embodiments, the configurable workflow service may release some or all such computing nodes to be available after an implementation and provide the same types of provisioning of computing nodes (optionally different computing nodes) for a next implementation.

A defined workflow may further have additional types of associated information in at least some embodiments. For example, a client may specify information that indicates when to implement a defined workflow, e.g., based on a client instruction for immediate implementation, by scheduling future implementation at one or more defined future times, by scheduling one or more future implementations when one or more defined criteria are satisfied (e.g., based at least in part on availability of particular source data), etc. Defined criteria may be specified in various manners, such as criteria associated with particular workflow components or instead with the defined workflow as a whole. For example, a particular workflow component may have defined pre-condition criteria to be evaluated to determine when to execute the workflow component. Additionally, a particular workflow component may have defined post-condition criteria to be evaluated to determine when to complete execution and/or where to provide the output data (e.g., to a next workflow component, to an intermediate storage location, etc.). In some embodiments and situations, a defined workflow may further have one or more associated alarms that may be used to provide notification to a client (or to perform other activities) when one or more specified criteria are satisfied or are not satisfied (e.g., if a defined workflow is not implemented at a particular time, such as if particular source data is not available).

The configurable workflow service may further be a fee-based service in at least some embodiments, such that clients of the configurable workflow service are customers that pay fees to the provider of the configurable workflow service for at least some of the functionality provided by the configurable workflow service. In addition, when one or more online storage services and/or online execution services are used by the configurable workflow service as part of implementing a particular defined workflow for a particular client, the provider(s) of such other services may also optionally charge fees for such use, whether via the configurable workflow service or directly to the client.

Thus, use of the configurable workflow service in the data pipeline may provide various benefits in various embodiments, including enabling a client to schedule gathering data from multiple sources at particular times or otherwise when particular criteria are satisfied, performing defined types of data manipulation operations on the source data, and providing output data produced by the defined workflow in various manners. Additional benefits are discussed elsewhere herein, and will otherwise be appreciated by those skilled in the art.

In one embodiment, configurable workflow service ("CWS") workflows (also referred to as "pipelines") are defined via a configuration language that enables description of nodes (also referred to as "objects") that form a pipeline. In one embodiment, a pipeline may include objects from any of the following categories: Data Sources, Activities, Pre-Conditions and Post-Conditions, Schedules, and Alarms. In one embodiment, a Data Source is an input to or an output from a data manipulation workflow component (also referred to as an "activity" in this example embodiment).

In one embodiment, an Activity is an operation to be performed, such as data processing transformations, data copies, etc. Activities can be set to alarm on certain states and to retry multiple times on failure. In one embodiment, predefined activities may include Copy, SQLTransform, HiveQLTransform, ElasticMapReduceTransform, CommandLineTransform, and other suitable activities.

In one embodiment, a Pre-Condition or a Post-Condition is an action associated with a Data Source that evaluates to true when the Data Source is considered available and/or well formed. Pre-conditions that complete successfully enable a following Activity that consumes a Data Source as an input to be run. Post-conditions that complete successfully may enable an Activity that creates a Data Source to be considered successfully completed.

In one embodiment, a Schedule is an attribute of a Data Source that describes the periodicity of the data or an attribute of an Activity that defines the periodicity of when it runs. The periodicity can be at a granularity of one or more minutes, one or more hours, one or more days, one or more weeks, one or more months, etc.

In one embodiment, an Alarm describes a message to be published to a notification service (e.g., Amazon's SNS, or Simple Notification Service), sent via an electronic communication (e.g., e-mail), etc. Pipelines and individual Activities may have an Alarm defined for failure and/or success.

Connector Interface for a Data Pipeline

In one embodiment, an application programming interface (API) may permit users of the data pipeline to define programmatic connectors to arbitrary data sources. Using these connectors, the data pipeline may perform large-scale, distributed processing using operations that interact with the connectors to obtain data. To use a particular data source in a pipeline, a data source provider or other entity may write program code that implements the connector API. The program code that implements the connector API may act as a driver for a data source within the pipeline system.

FIG. 1A illustrates an example system environment for a connector interface in a data pipeline, according to one embodiment. The example system environment may comprise a data pipeline system 100A. The data pipeline system 100A may permit a user to define one or more pipelines. For purposes of example, FIG. 1A illustrates an example pipeline 120A that includes a data source node 130 representing a data source and an activity node 140A representing a workflow activity that uses data provided by the data source node 130. However, it is contemplated that other types and numbers of nodes may be used with the data pipeline system 100A.

Figure 10:
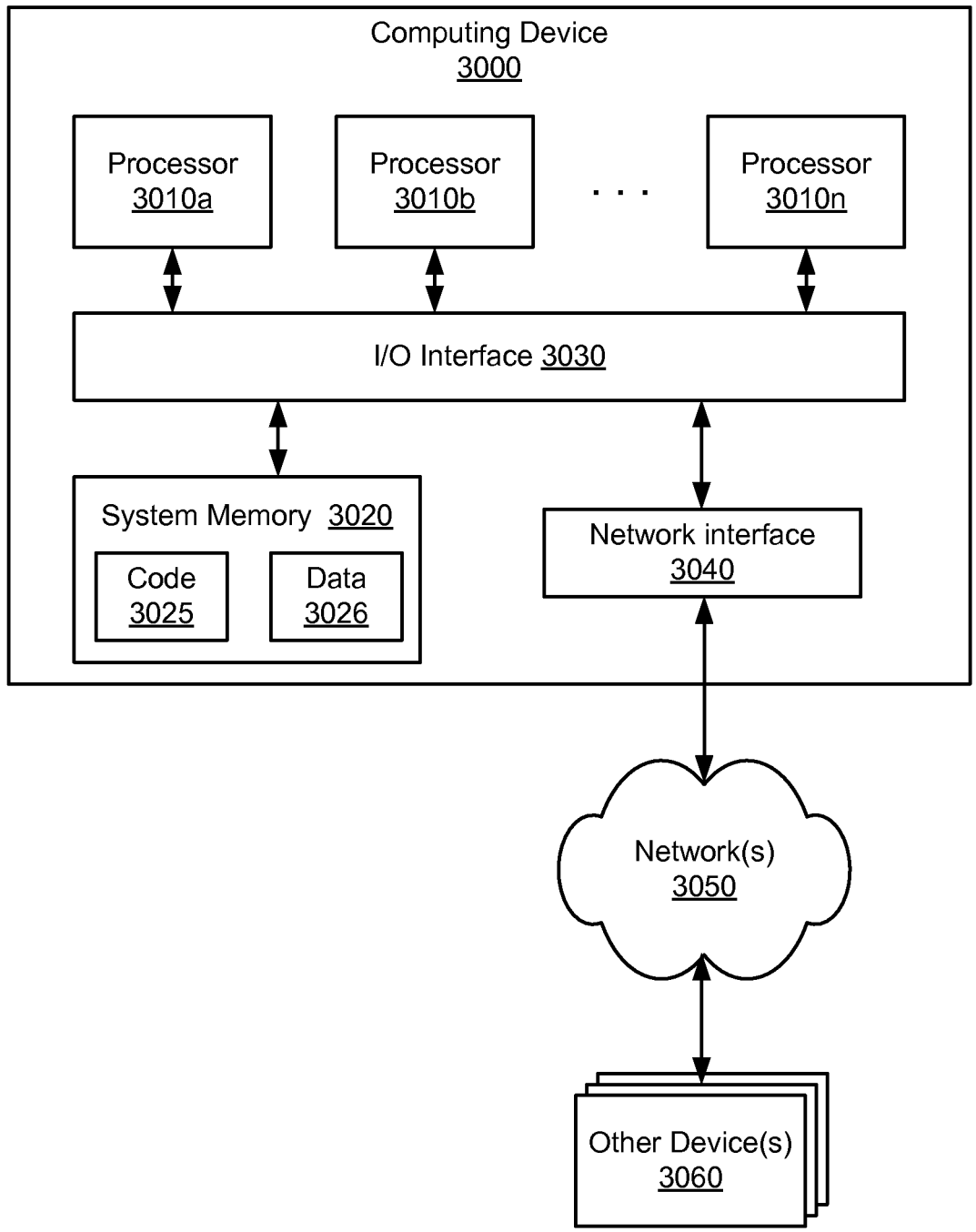
FIG. 10 illustrates an example of a computing device that may be used in some embodiments.

The data pipeline system 100A may comprise one or more computing devices, any of which may be implemented by the example computing device 3000 illustrated in FIG. 10. In various embodiments, the functionality of the different components of the data pipeline system 100A may be provided by the same computing device or by different computing devices. If the different components are implemented using different computing devices, then the components and their respective computing devices may be communicatively coupled, e.g., via one or more networks.

A connector 110 may implement or follow a connector interface 112. By implementing the connector interface, the connector 110 may enable a data source node 130 of the pipeline 120A to provide data from a particular data source 114. In various embodiments, the connector interface 112 may require a set of methods including, but not limited to, any of the following: open connection, validate connection, read record, add new record, overwrite existing record, get list of all fields for a record, get list of all values for a record, add fields for a record, and remove fields for a record. The connector 110 may implement these methods as methods 113. The connector 110 may comprise a set of suitable program code which, when executed on suitable computing hardware, performs the methods 113.

Using the methods 113 associated with the connector interface 112, the connector may communicate with components of the pipeline 120A (e.g., the activity node 140A) and also with the data source 114 (e.g., any suitable data storage device, data storage service, or other data storage system, including clusters). Accordingly, using methods 113 associated with the connector interface 112, the connector 110 may obtain particular elements of data from the data source 114 and provide the data to the activity node 140A of the pipeline 120A. In one embodiment, the activity node may describe or represent a workflow activity, and the connector may provide the acquired data to the workflow activity. In one embodiment, the connector may provide the acquired data to one or more resources that are coordinated by the workflow activity.

In obtaining the data from the data source 114 and providing it to the data source node 130, the connector 110 may map the data from its original format to an arbitrary data structure, referred to herein as a record, used by the pipeline 120A. By implementing the connector interface 112 and performing the associated methods 113, the connector 110 may determine the availability of the data source 114 or perform other discovery operations. By implementing the connector interface 112 and performing the associated methods 113, the connector 110 may interrogate the data source 114 for information relating to the size of the data stored in the data source 114. By implementing the connector interface 112 and performing the associated methods 113, the connector 110 may support automatic retry of suitable ones of the methods 113.

Figure 1B:
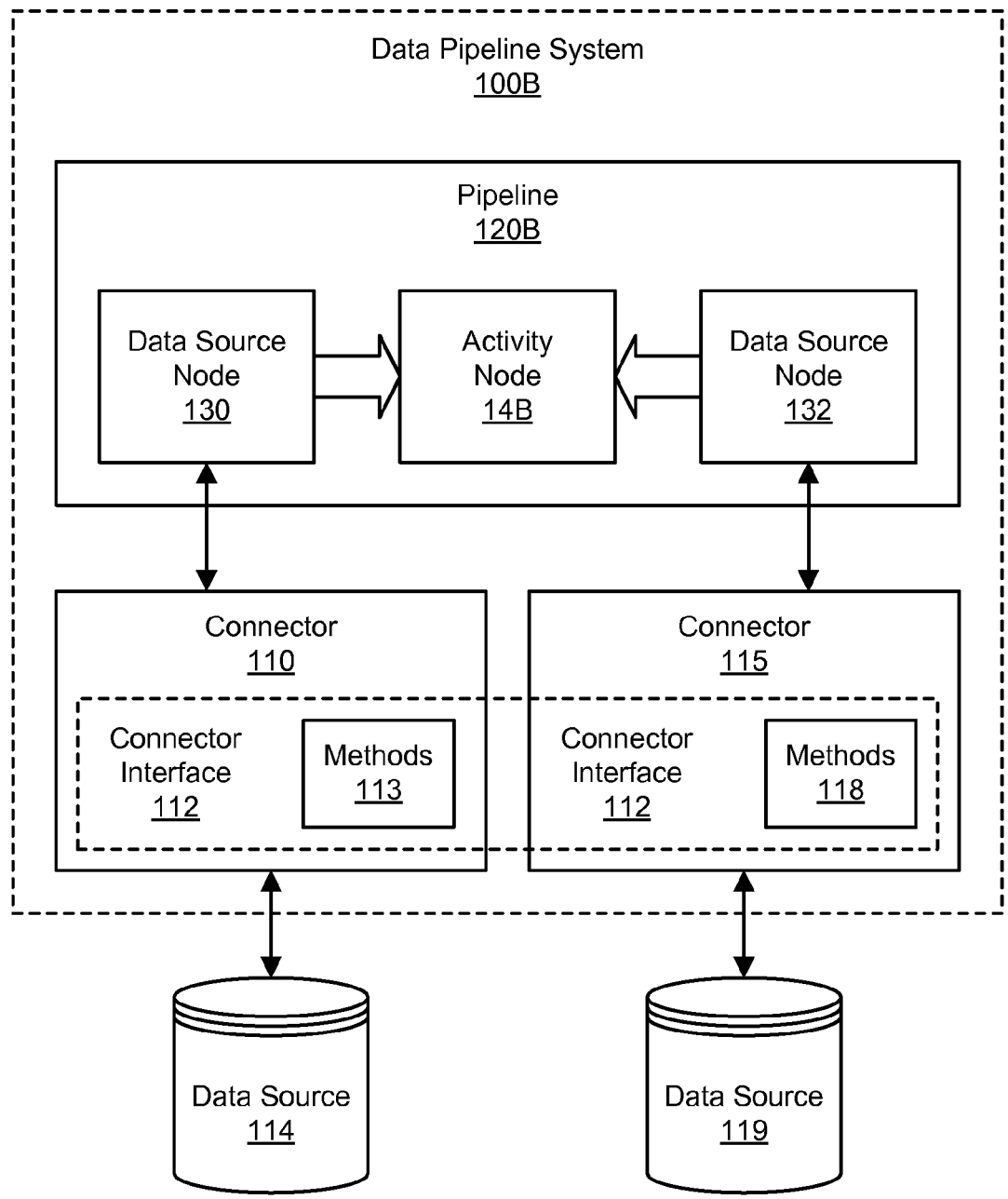

FIG. 1B illustrates an example system environment for a connector interface in a data pipeline, according to one embodiment. The example system environment may comprise a data pipeline system 100B. The data pipeline system 100B may permit a user to define one or more pipelines. For purposes of example, FIG. 1B illustrates an example pipeline 120B that includes a first data source node 130, and a second data source node 132, and an activity node 140B representing a workflow activity that uses data provided by both data source nodes. However, it is contemplated that other types and numbers of nodes may be used with the data pipeline system 100B.

The data pipeline system 100B may comprise one or more computing devices, any of which may be implemented by the example computing device 3000 illustrated in FIG. 10. In various embodiments, the functionality of the different components of the data pipeline system 100B may be provided by the same computing device or by different computing devices. If the different components are implemented using different computing devices, then the components and their respective computing devices may be communicatively coupled, e.g., via one or more networks.

A connector 110 may implement or follow the connector interface 112. By implementing the connector interface, the connector 110 may enable a data source node 130 of the pipeline 120B to provide data from a particular data source 114. Another connector 115 may similarly implement the same connector interface 112 in order to provide access within the data pipeline system 100B to another data source 119. In various embodiments, the connector interface 112 may require a set of methods including, but not limited to, any of the following: open connection, validate connection, read record, add new record, overwrite existing record, get list of all fields for a record, get list of all values for a record, add fields for a record, and remove fields for a record. Each of the connectors 110 and 115 may implement these methods as methods 113 and 118, respectively. The connector 110 may comprise a set of suitable program code which, when executed on suitable computing hardware, performs the methods 113. The connector 115 may comprise a different set of suitable program code which, when executed on suitable computing hardware, performs the methods 118. The data source 114 may store data in a different format than the data source 119.

Using the methods 113 associated with the connector interface 112, the connector may communicate with components of the pipeline 120B (e.g., the activity node 140B) and also with the data source 114 (e.g., any suitable data storage device, data storage service, or other data storage system, including clusters). Accordingly, using methods 113 associated with the connector interface 112, the connector 110 may obtain particular elements of data from the data source 114 and provide the data to the activity node 140B of the pipeline 120B. Similarly, using methods 118 associated with the connector interface 112, the connector 115 may obtain particular elements of data from the data source 119 and provide the data to the activity node 140B of the pipeline 120B. In one embodiment, the activity node may describe or represent a workflow activity, and the connectors may provide the acquired data to the workflow activity. In one embodiment, the connectors may provide the acquired data to one or more resources that are coordinated by the workflow activity. The activity node 140B, workflow activity, or other resources may aggregate the data from the disparate data sources.

In obtaining the data from the data source 114 or 119 and providing it to the data source node 120B, the connector 110 or 115 may map the data from its original format to an arbitrary data structure, referred to herein as a record, used by the pipeline 120B. By implementing the connector interface 112 and performing the associated methods 113 or 118, the connector 110 or 115 may determine the availability of the data source 114 or 119 or perform other discovery operations. By implementing the connector interface 112 and performing the associated methods 113 or 118, the connector 110 or 115 may interrogate the data source 114 or 119 for information relating to the size of the data stored in the data source 114 or 119. By implementing the connector interface 112 and performing the associated methods 113 or 118, the connector 110 or 115 may support automatic retry of suitable ones of the methods 113 or 118.

Figure 1C:
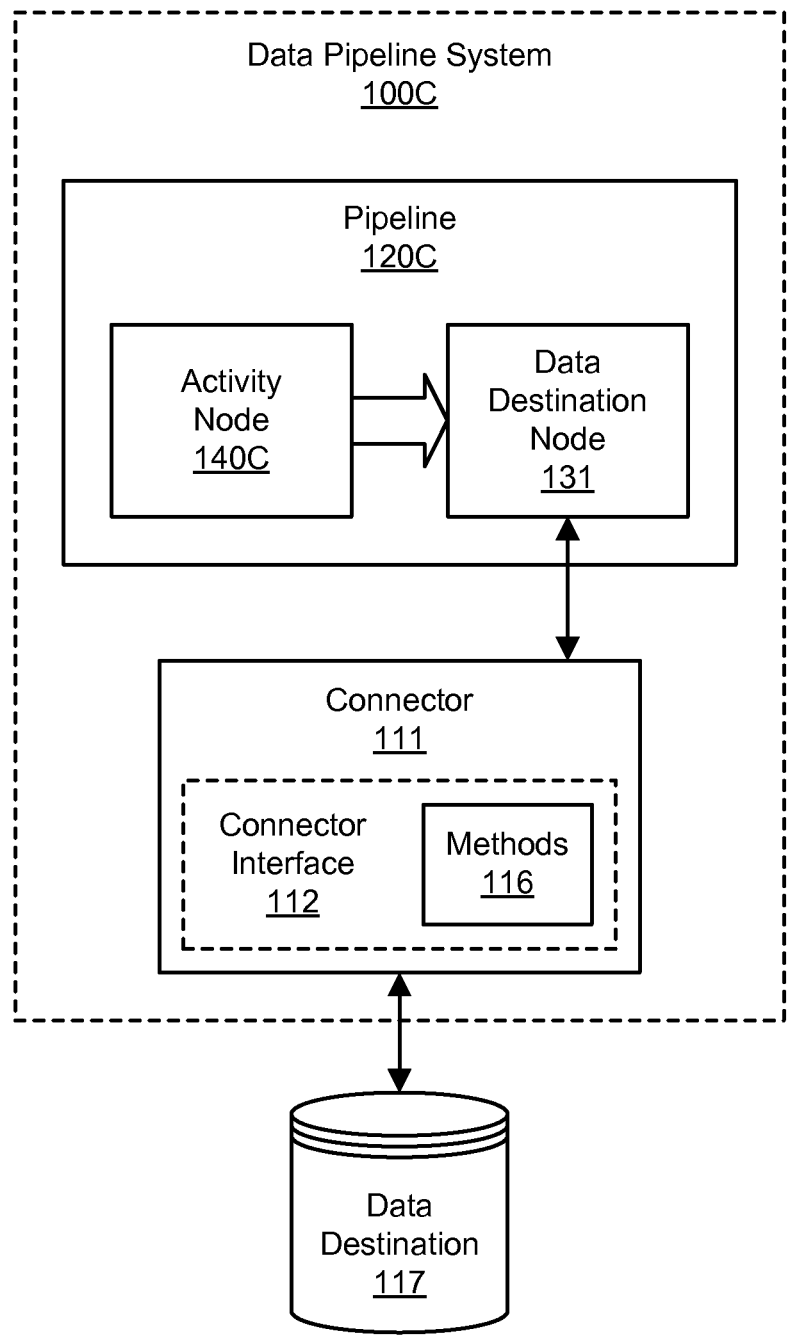

FIG. 1C illustrates an example system environment for a connector interface in a data pipeline, according to one embodiment. The example system environment may comprise a data pipeline system 100C. The data pipeline system 100C may permit a user to define one or more pipelines. For purposes of example, FIG. 1C illustrates an example pipeline 120C that includes a data destination node 131 and an activity node 140A representing a workflow activity that outputs data using the data destination node 131. However, it is contemplated that other types and numbers of nodes may be used with the data pipeline system 100C.

The data pipeline system 100C may comprise one or more computing devices, any of which may be implemented by the example computing device 3000 illustrated in FIG. 10. In various embodiments, the functionality of the different components of the data pipeline system 100C may be provided by the same computing device or by different computing devices. If the different components are implemented using different computing devices, then the components and their respective computing devices may be communicatively coupled, e.g., via one or more networks.

A connector 111 may implement or follow the connector interface 112. By implementing the connector interface, the connector 110 may enable a data destination node 131 of the pipeline 120C to provide data to a particular data destination 117. In various embodiments, the connector interface 112 may require a set of methods including, but not limited to, any of the following: open connection, validate connection, read record, add new record, overwrite existing record, get list of all fields for a record, get list of all values for a record, add fields for a record, and remove fields for a record. The connector 111 may implement these methods as methods 116. The connector 111 may comprise a set of suitable program code which, when executed on suitable computing hardware, performs the methods 116.

Using the methods 116 associated with the connector interface 112, the connector may communicate with components of the pipeline 120C (e.g., the activity node 140C) and also with the data destination 117 (e.g., any suitable data storage device, data storage service, or other data storage system, including clusters). Accordingly, using methods 116 associated with the connector interface 112, the connector 111 may store particular elements of data in the data destination 117, such as data received from the activity node 140C of the pipeline 120C. In one embodiment, the activity node may describe or represent a workflow activity, and the workflow activity may provide the output data to the connector. In one embodiment, the connector may receive the output data from one or more resources that are coordinated by the workflow activity.

In obtaining the data from the activity node 140C and providing it to the data destination 117, the connector 111 may map the data from an arbitrary data structure, used by the pipeline 120C to a data structure used by the data destination 117. By implementing the connector interface 112 and performing the associated methods 116, the connector 111 may determine the availability of the data destination 117 or perform other discovery operations. By implementing the connector interface 112 and performing the associated methods 116, the connector 111 may support automatic retry of suitable ones of the methods 116.

Figure 2:
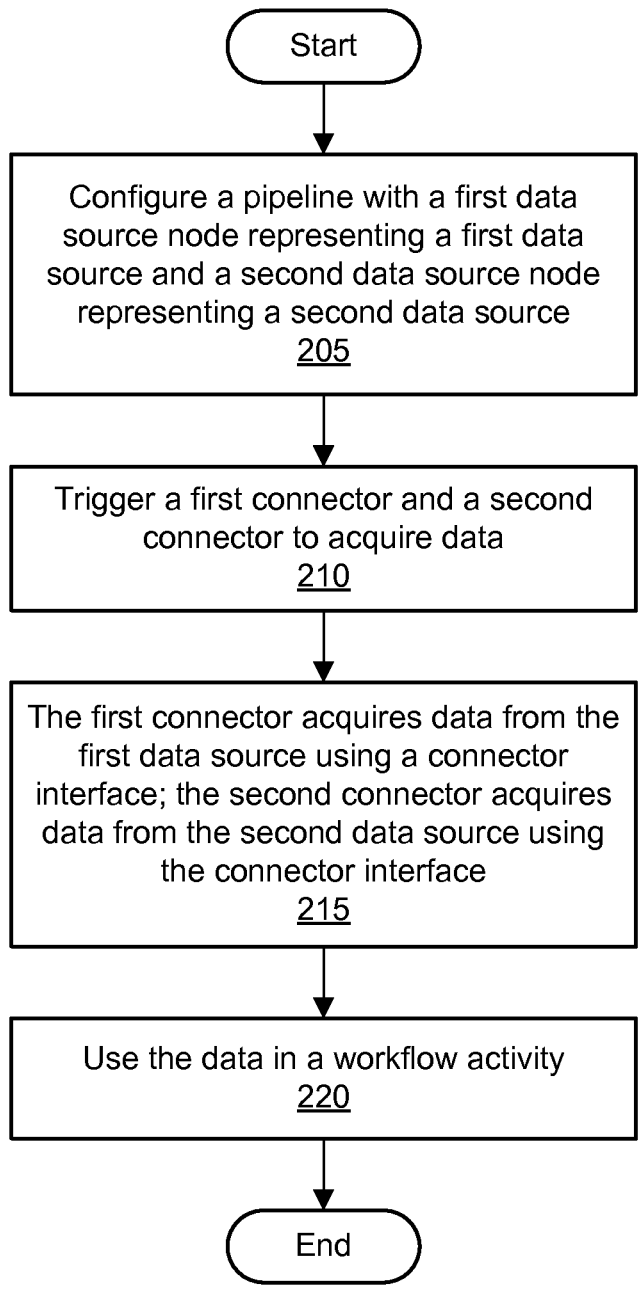
FIG. 2 is a flowchart illustrating a method for using a connector interface in a data pipeline, according to one embodiment.

FIG. 2 is a flowchart illustrating a method for using a connector interface in a data pipeline, according to one embodiment. As shown in 205, a pipeline may be configured with a first data source node and a second data source node. Each data source node represents a different data source from which data is to be obtained. The pipeline may also be configured with an activity node representing a workflow activity that uses the data provided by the data source nodes. As shown in 210, a connector associated with each of the data sources may be triggered to obtain the data from the data source.

As shown in 215, using one or more methods associated with the connector interface, the first connector may obtain data from the first data source, and the second connector may obtain data from the second data source. In one embodiment, each connector may use one or more methods associated with the connector interface to determine the availability of the data and/or the data source. Either of the connectors may optionally change the format of the data. Each connector may use one or more methods associated with the connector interface to send the data to an activity node, to the workflow activity represented by the activity node, or to one or more resources managed by the workflow activity. As shown in 220, the pipeline may then use the data obtained by the data source node in a workflow activity such as, for example, a data transformation or a data copy. The workflow activity may be represented by an activity node in the pipeline that is configured to accept data from the data source nodes as input.

Scheduler for a Data Pipeline

In some embodiments, a scheduler associated with the data pipeline system may allow users to schedule large numbers of periodic tasks. The tasks may have complex inter-task dependencies. For example, using the pipeline scheduler, a user may specify that tasks A, B, and C should run every day, but task C should not execute until A and B are complete. The scheduler may be multi-threaded, and decisions made by the scheduler may be distributed among different computing devices and/or software processes. The distributed nature of the pipeline scheduler may allow users to build dependency trees such that tasks are executed in parallel as soon as the tasks are ready.

The pipeline system may provide this functionality by creating one object per task. In the example discussed above, an object A, object B, and object C would be created every day to implement tasks A, B, and C, respectively. In one embodiment, objects may be created in advance of their scheduled execution time to spread out system load. For example, if a spike in usage of object creation is expected at a certain time, some of the objects may be proactively created in advance of the certain time. The objects created beforehand may be put to sleep or otherwise put in a waiting state until the scheduled execution time.

In one embodiment, objects which do not depend on any other objects may sleep on a timer that wakes them up to begin execution at their scheduled start. However, objects which depend on other objects may be placed into an indefinite sleep. Once an object completes execution, it may signal all objects that depend on it to wake up and re-evaluate their dependency status. In one embodiment, when an object receives a signal, it may wake up and do one of two things: either go back to sleep if all of its requirements are not yet met or begin execution if all of its requirements have been met. In one embodiment, object dependencies may be programmed into objects. In one embodiment, objects may determine dependencies by querying an external lookup table or other data repository which stores dependency data.

Users of the pipeline system may create pipelines as a basic resource. A pipeline includes one or more scheduled activities that execute a configurable number of times, e.g., ranging from once to every hour for an unbounded time period. On the backend, each of these activities may be implemented as an object definition based in Simple Workflow Service (SWF) that continually polls and, as necessary, creates SWF-based objects corresponding to individual scheduled executions representing of the object definition (aka the activity). Each object definition (and its associated scheduled execution) may require one or more actual SWF object executions because the pipeline system may automatically retry failures. All of these objects may have both SWF costs associated with their creation and DynamoDB (or other database) costs associated with their tracking Execution may be performed by remote runners, also referred to herein as task runners: Java agents that poll the pipeline application programming interfaces (APIs) for work and then respond appropriately. This polling behavior has a non-zero cost to the pipeline system in the form of Dynamo operations used to track execution timeouts.

Additionally, the pipeline system may support control plane preconditions, e.g., data availability checks performed from its control plane. For these checks, both the polling behavior and the execution may be performed on a fleet of machines in the pipeline system's control plane. These preconditions may incur higher costs to EDP due to their requirement of hardware availability in the pipeline system's control plane. Additionally, some costs attributable to the pipeline system (e.g., webserver hardware to host the console, webservers to respond to customer API requests) will scale slowly with the number of objects and pipelines.

Figure 3:
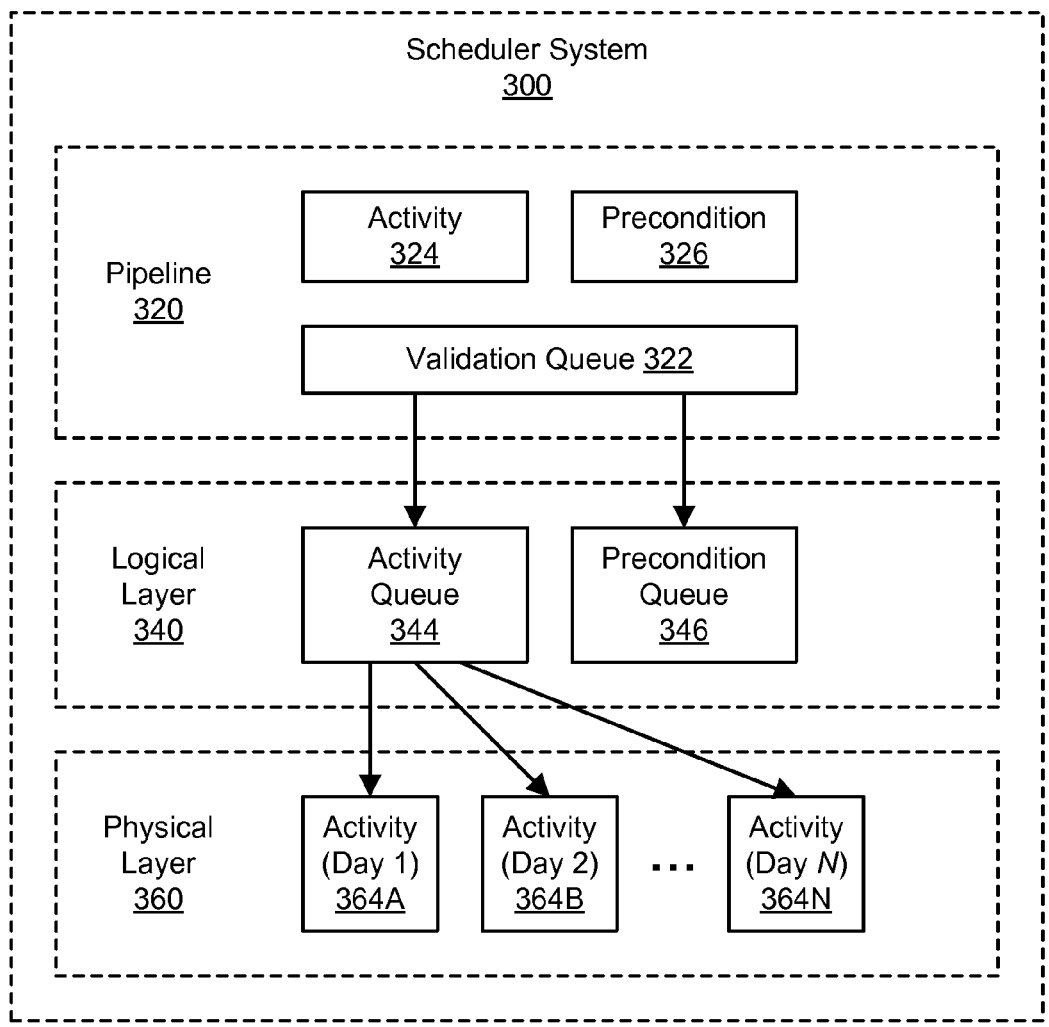
FIG. 3 illustrates an example system environment for a scheduler in a data pipeline, according to one embodiment.

FIG. 3 illustrates an example system environment for a scheduler in a data pipeline, according to one embodiment. A scheduler system 300 may include at least one pipeline 320 as well as various objects in a logical layer 340 and various objects in a physical layer 360. The objects may represent nodes in a graph and may also be referred to herein as node definitions or task descriptions. In one embodiment, the various objects in the pipeline 320, logical layer 340, and physical layer 360 may run on different computing devices. Pipeline 320 may comprise a single queue 322, and when the pipeline 320 is activated, the queue may validate the pipeline (e.g., validate the semantics of the definitions of elements of the pipeline). Objects in the logical layer 340 may be created if the validation is successful.

The logical layer 340 may comprise one or more queues for each schedulable object in the pipeline. For example, if the pipeline contains objects representing an activity 324 and a precondition 326, and if the activity 324 and precondition 326 pass the validation, then the logical layer 340 may be created with an activity queue 344 and a precondition queue 346 corresponding to the activity 324 and precondition 326, respectively. The pipeline 320 may contain other types and numbers of items than the ones illustrated in FIG. 3. Each queue in the logical layer 344 may monitor the schedule for its corresponding object in the pipeline 320; at appropriate times, the queue may create corresponding objects in the physical layer 360. Each task definition (e.g., activity 324 or precondition 326) may be represented by one or more processes in the logical layer 340. In one embodiment, each queue may include a schedule monitoring process and an object creation process. The object creation process may sleep at times when object creation is not required. An object in the logical layer 340 may use one or more API calls to a simple workflow service (SWF) to instantiate objects in the physical layer 360.

In one embodiment, the physical layer 360 represents individually scheduled events or iterations of events. Each object in the physical layer 360 may manage, monitor, and/or otherwise perform the execution of a task corresponding to a schedulable item in the pipeline 320. For example, if the activity 324 is scheduled to run once per day, then an corresponding object in the physical layer 360 may be created for each daily instance of the activity 324. As illustrated for purposes of example, activity objects may be created in the physical layer 360 for a first day 364A, a second day 364B, and any number of intermediate days (not shown) through an Nth day 364N. Objects representing events associated with the precondition may also be included in the physical layer 360. The corresponding queue in the logical layer 340 (e.g., the activity queue 344) may monitor the schedule for schedulable items and create objects in the physical layer 360 (e.g., daily activities 364A, 364B, 364N) at appropriate times. In one embodiment, objects in the physical layer may be created at or immediately prior to the time at which the corresponding event is scheduled; however, the objects may also be created earlier, e.g., to avoid a spike in object creation. A queue in the logical layer 340 may sleep or otherwise stay in an inactive state when it is not checking the schedule or creating objects in the physical layer 360. In one embodiment, objects in the logical layer 340 may obtain data concerning the objects to be created in the physical layer 360 from an external data repository (e.g., DynamoDB).

Upon its creation and/or scheduled time being met, an object in the physical layer 360 may execute without waiting if the object has no dependencies. However, the object may go to sleep if it has dependencies that are unmet. If an object in the physical layer 360 completes successfully, it may determine if it has direct dependents. If so, then the object may signal to each of its directly dependent objects that it has completed successfully, and each of the dependent objects may then determine if it is ready to execute (e.g., if the object has no outstanding dependencies). At that time, a dependent object may execute if all of its dependencies have been met or go back to sleep if all of its dependencies have not been met. In one embodiment, a physical object that completes successfully may send a notification to a user (e.g., using SNS).

In one embodiment, an object in the physical layer 360 may wake periodically from sleep to determine if its dependencies have been met or if has a result due at a particular time. In one embodiment, objects in the logical layer 340 may monitor the corresponding objects in the physical layer 360 and recreate any physical objects that have failed, stalled, etc. In one embodiment, the rate of creation of objects in the physical layer 360 by a single queue or pipeline may be throttled or capped. In one embodiment, an object in the logical layer 340 may be configured to create objects in the physical layer 360 in a particular order. In one embodiment, the logical layer 340 may use the object dependency information to trigger the re-execution of previously executed tasks that are dependent on a particular task, such as the re-computation of previously computed data, e.g., if data corruption is detected. The re-execution may be performed automatically or by instruction from a user (e.g., through an API call).

In one embodiment, the pipeline may be multi-dimensional by unfolding across different regions (or other suitable dimensions) as well as different times. In one embodiment, an attempt layer may be created below the physical layer. The attempt layer may permit the automatic retry of tasks previously executed at the physical layer.

Figure 4:
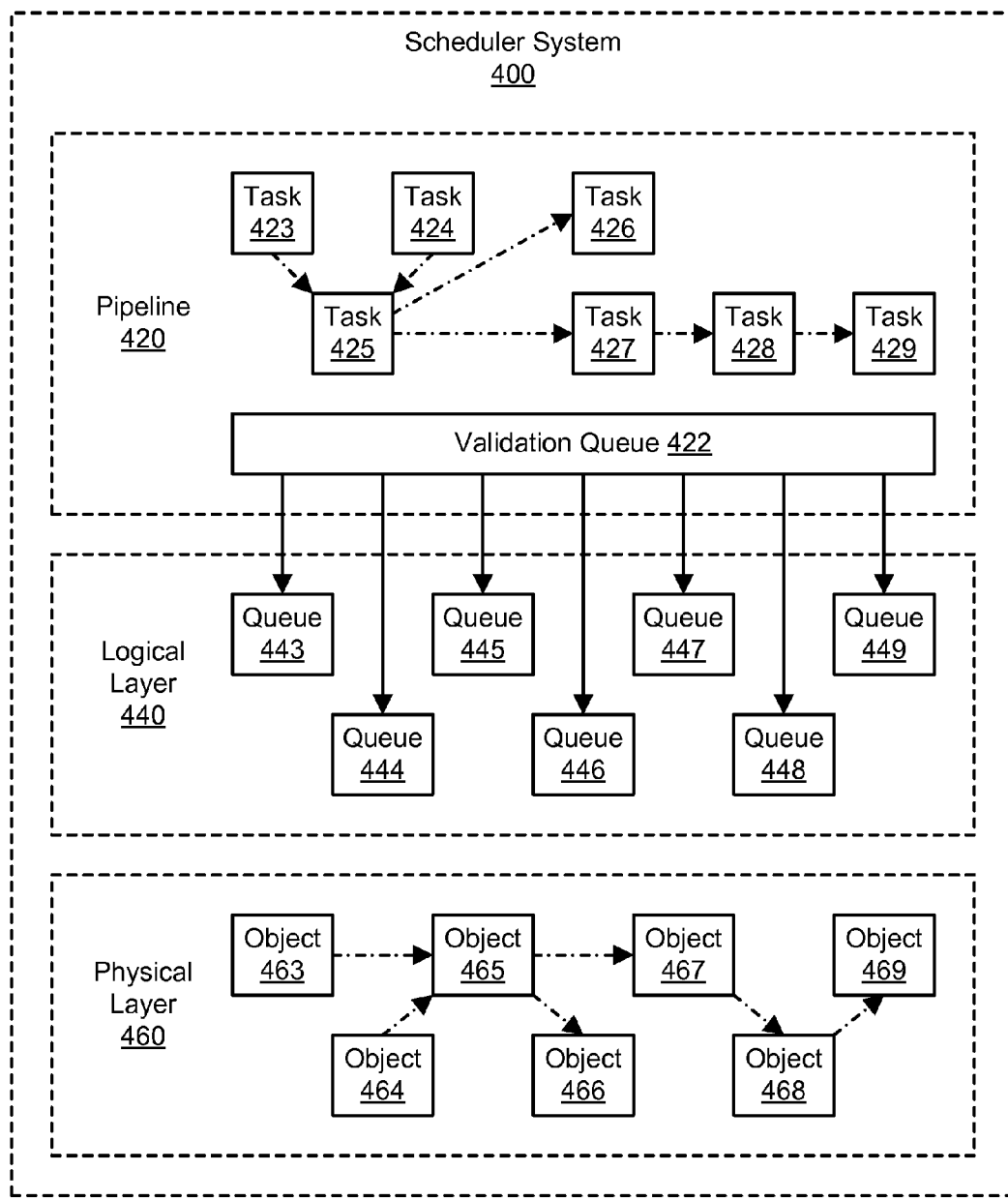
FIG. 4 illustrates an example system environment for a scheduler in a data pipeline including dependencies between objects, according to one embodiment.

FIG. 4 illustrates an example system environment for a scheduler in a data pipeline including dependencies between objects, according to one embodiment. As described above with reference to FIG. 3, a scheduler system 400 may comprise a pipeline 420, a logical layer 440, and a physical layer 460. In this example, the pipeline 420 may be configured with seven schedulable items: task 423, task 424, task 425, task 426, task 427, task 428, and task 429. Tasks 423-427 may be scheduled for daily execution, and tasks 428 and 429 may be scheduled for weekly execution. The tasks may have dependencies such that task 425 is dependent on tasks 423 and 424, tasks 426 and 427 are dependent on task 425, task 428 is dependent on task 427, and task 429 is dependent on task 428. A dependency typically indicates a need for data supplied by one task to the dependent task.

Upon activation of the pipeline 420, the validation queue may 422 may validate each of the tasks 423-429. If the validation succeeds, then the logical layer 440 may be created with at least one queue 443-449 corresponding to each of the tasks 423-449. At an appropriate time, the logical layer 440 may create objects in the physical layer once per day for the daily tasks and once per week for the weekly tasks. Accordingly, object 463, object 464, object 465, object 466, and object 467 may be instantiated each day, while object 468 and object 469 may be instantiated each week. The objects in the physical layer that are dependent on other objects may be put to sleep while the dependencies are satisfied.

Objects 463 and 464 are not dependent on other objects and can be scheduled to begin execution at any appropriate time. Upon completion of its task, object 463 may send a notification to its dependent object 465. Upon completion of its task, object 464 may also send a notification to its dependent object 465. After it receives the first of the two necessary notifications, object 465 may go back to sleep. Only after it receives both of the two necessary notifications will object 465 begin performing its task. Upon completion of its task, object 465 may send a notification to its dependent objects 466 and 467. Because objects 466 and 467 have only one dependency (i.e., object 465), objects 466 and 467 may wake up and immediately begin executing upon receiving the notification from object 465. Because object 467 executes its task daily while its dependent object 468 executes its task weekly, object 467 may send up to seven notifications to object 468 before object 468 is ready to execute according to its schedule. Upon completion of its task, object 468 may send a notification to its dependent object 469, and object 469 may then wake from sleep and execute its task.

Figure 5:
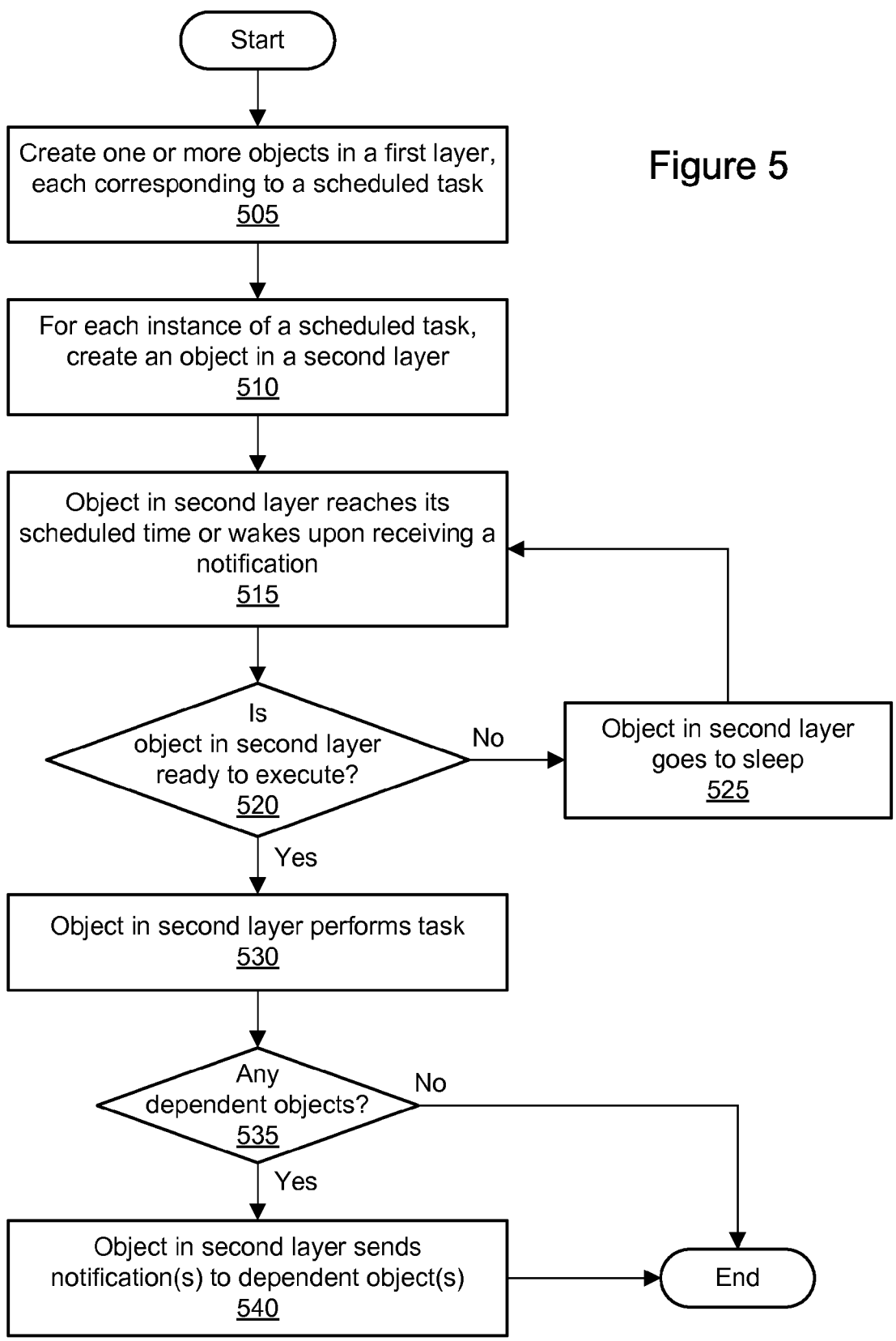
FIG. 5 is a flowchart illustrating a method for using a scheduler in a data pipeline, according to one embodiment.

FIG. 5 is a flowchart illustrating a method for using a scheduler in a data pipeline, according to one embodiment. As shown in 505, one or more objects in a first layer may be created. The first layer may be referred to as a logical layer. The objects in the first layer may be created upon activation and validation of a pipeline. Each of the objects in the first layer may correspond to a regularly scheduled task.

As shown in 510, each of the objects in the first layer may cause the instantiation of a corresponding object in a second layer for each scheduled instance of a task. For example, if a task is scheduled for daily execution, then the scheduler system 400 may create a corresponding object in the second layer on a daily basis. Accordingly, each object in the second layer may be created on behalf of a corresponding object in the first layer. At least some of the objects in the second layer may go to sleep or otherwise enter an inactive or quiescent state upon instantiation.

As shown in 515, an object in the second layer may reach its scheduled time of execution and/or be awakened from its sleep state, e.g., upon receiving a notification from another object on which it depends. As shown in 520, the object in the second layer may determine if it is ready to perform its task. In determining whether an object is ready to perform its task, the scheduler system may determine if all of it's the object's dependencies have been met. Each of the objects in the second layer may have a priority value. In determining whether the object is ready to perform its task, the scheduler system may also determine whether the relative priority value for the object permits its execution at the current time. For example, if some tasks have a higher priority than other tasks, then a lower-priority task may be deemed not ready to execute if one or more higher-priority tasks have not yet completed execution.

As shown in 525, the object may go to sleep or otherwise be quiesced if it is not ready to execute the task, e.g., if all of its dependencies have not been met. As shown in 530, however, if all its dependencies have been met, the object may perform its task. As shown in 535, upon completion of its task, the object may determine whether any objects are dependent on it. If so, then as shown in 540, the object may send a notification that it has completed its task to any dependent object(s).

As a further example, assume that a pipeline user creates a daily pipeline including the following: (1) a daily schedule that begins at 3 PM every day and runs for the next year; (2) a precondition checking for S3 data availability (executed in the pipeline control plane), on the daily schedule; (3) another precondition checking for data availability on an on-premise Java Database Connectivity (JDBC) source, also on the daily schedule; (4) daily activity to copy the data from (3) into S3; (5) an Elastic MapReduce (EMR) analysis job that will trigger once (2) is available and (4) is complete; and (6) an e-mail alarm that will be triggered if the EMR analysis is triggered.

The example pipeline may include the following internal objects: (1) one pipeline; (2) two non-schedulable objects (i.e., the schedule (1) and alarm (6) definitions, pipeline objects that are only associated with the execution or evaluation of an activity or a datanode but are never themselves directly executed); (3) four object definitions and their associated SWF workflows representing the pipeline objects that are directly scheduled and executed (in this case, items (2), (3), (4), and (5)); and (4) four objects—one for each object definition—for every individual execution of the pipeline. Because this is a daily pipeline starting at 3 PM, in this case four objects may be created each day at 3 PM.

In one embodiment, when the user submits this pipeline to the pipeline system, a single pipeline level SWF workflow will be created. Initially, this workflow may be responsible for ensuring pipeline validation and the creation of eight object definition workflows—two for each of the four object definitions in the pipeline. Because items (1) and (6) are not executed on a schedule, they may not have associated object definition workflows. After creating the object definition workflows, the pipeline workflow may enter a state in which it polls the object definition workflows for health and recreates them if necessary. The pipeline workflow may remain active as long as the pipeline is schedule to execute—e.g., for this pipeline, a period of one year unless the user intervenes and deletes or deactivates the pipeline before that time.

In one embodiment, the set of object definition workflows assigned to each object definition has two jobs. First, every time an object is ready to begin execution, the workflows may wake up and create another SWF workflow (i.e., the object workflow). For this example pipeline, every day at 3 PM, two new SWF object workflows may be created by the object definition workflows: one for the S3 precondition (2) and one for the JDBC precondition (3). The object definition workflows may then monitor the object workflows and enforce proper timeout behavior. In the case of activities such as the daily activity to copy the data (4) and the EMR analysis job (5), which depend on the successful execution of previous preconditions or activities, the object definition workflows may poll the system's state and create the object workflows once the appropriate preconditions are complete.

Once created, each object workflow may begin executing its activities. For preconditions, the workflows may retry preconditions an indeterminate number of times, optionally stopping once a user-configured timeout period has passed. For activities, the workflows may retry up to a fixed number of tries (e.g., by default, 3). Once execution of the pipeline object has succeeded, the physical workflows may be terminated. However, a user may retry execution of the pipeline object, resulting in the recreation of the object workflows.

In one embodiment, both the workflow polling behavior and the execution of pipeline objects may consume multiple states in the underlying pipeline state machine. This state machine may be implemented on top of SWF timers and activities; thus, there is a non-zero SWF cost to polling and execution.

As a result of this process, the example pipeline may consume resources as follows. The daily schedule (1) that begins at 3 PM every day and runs for the next year may consume the following resources: DynamoDB Storage for the schedule definition. The precondition (2) checking for S3 data availability on the daily schedule may consume the following resources: DynamoDB storage for the precondition definition; two persistent object definition workflows; one object workflow per day, created at 3 PM and terminated when the precondition succeeds; SWF activities per precondition poll; and control plan resources to run the precondition. The second precondition (3) checking for data availability on an on-premise JDBC source, also on the daily schedule, may consume the following resources: DynamoDB storage for the precondition definition; two persistent object definition workflows; one object workflow per day, created at 3 PM and terminated when the precondition succeeds; SWF activities per precondition poll; and webserver resources to respond to the on-premise remote runner's status reports (while the precondition is in progress, if evaluation requires >1-2 minutes). The daily activity (4) to copy the data from (3) into S3 may consume the following resources: DynamoDB storage for the precondition definition; two persistent object definition workflows; one object workflow per day, created after precondition (3) succeeds and terminated when the activity succeed; SWF activities per execution attempt; and webserver resources to respond to the on-premise remote runner's status reports (while the activity is in progress). The EMR analysis job (5) that will trigger once (2) is available and (4) is complete may consume the following resources: DynamoDB storage for the precondition definition; two persistent object definition workflows; one object workflow per day, created after precondition (2) and activity (4) succeed and terminated when the activity succeeds; SWF activities per execution attempt; and webserver resources to respond to the on-premise remote runner's status reports (while the activity is in progress). The e-mail alarm (6) that will fire if the EMR analysis fires may consume the following resources: DynamoDB Storage for the schedule definition.

Configurable Workflows in a Data Pipeline

For illustrative purposes, some embodiments are described below in which specific instances of defining and implement workflows are provided in specific ways, including with respect to specific types of data, specific types of data manipulation operations, and specific types of storage services and execution services. These examples are provided for illustrative purposes and are simplified for the sake of brevity, and the inventive techniques can be used in a wide variety of other situations, some of which are discussed below, and the techniques are not limited to use with particular types of data, storage or other devices, computing systems or computing system arrangements.

Figure 6:
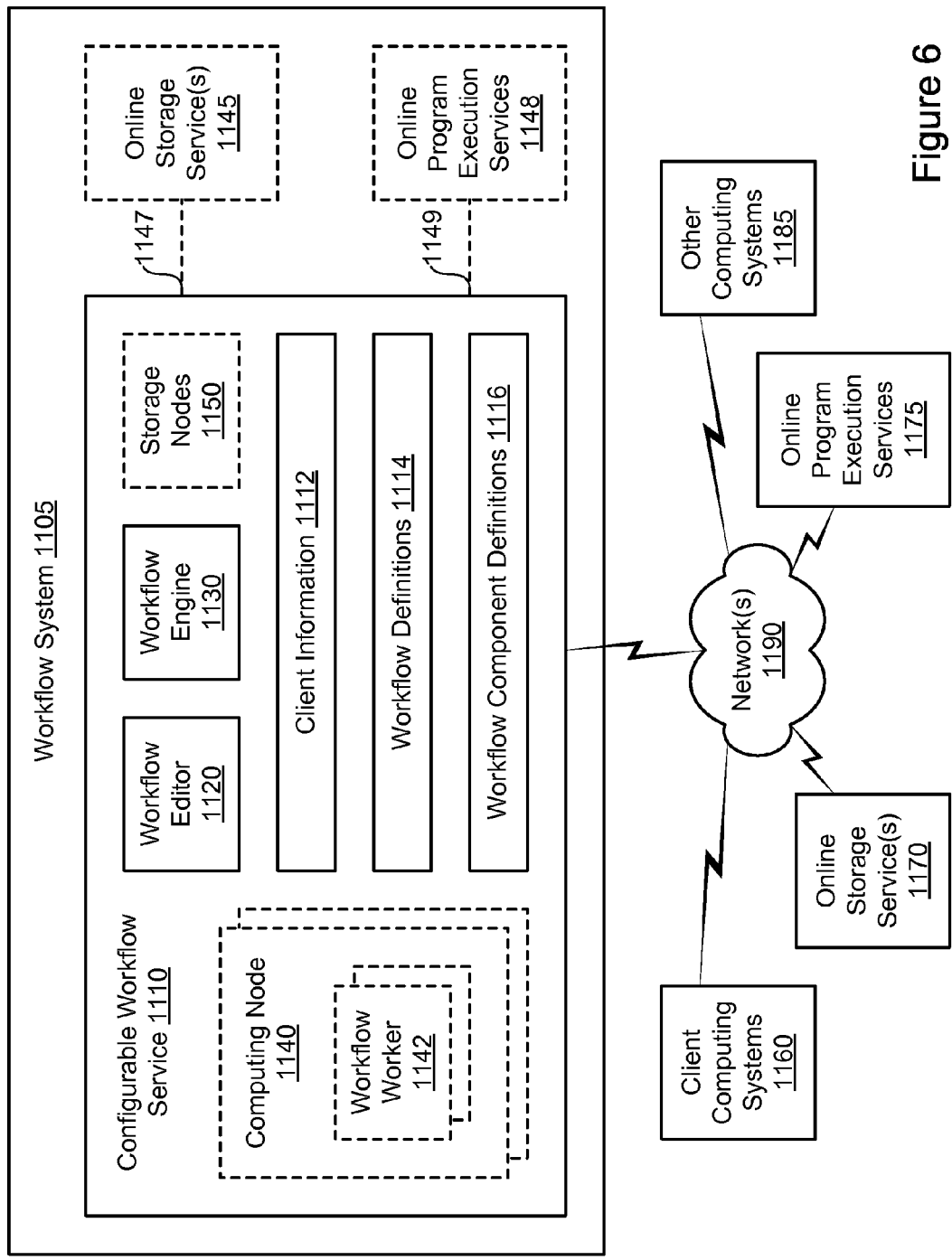
FIG. 6 illustrates an example embodiment of a configurable workflow service that provides functionality to enable remote clients to create, configure and execute defined workflows that manipulate source data in defined manners, according to one embodiment.

FIG. 6 is a network diagram that illustrates an example embodiment of a configurable workflow service 1110 that manages creation and execution of defined workflows for various clients of the configurable workflow service. As part of implementing a defined workflow, the configurable workflow service 1110 further provisions particular computing nodes to each perform specified activities corresponding to the defined workflow. In some embodiments, the configurable workflow service 1110 optionally provides a group of computing nodes 1140 on which defined workflows for clients may be executed. In other embodiments, some or all of the computing nodes used by the configurable workflow service may be provided externally to the configurable workflow service, such as by a client on whose behalf the defined workflow is implemented, by one or more online execution services, etc. In addition, in some embodiments, the configurable workflow service 1110 optionally includes one or more storage nodes 1150 on which data may be stored to facilitate the execution of defined workflows. For example, the storage nodes 1150, if present, may be used to store intermediate data results that are produced during execution of a defined workflow, and in some embodiments may further be used to store source data that is provided to a defined workflow and/or final output data produced by a defined workflow. While not illustrated in FIG. 6, the configurable workflow service may be implemented using one or more configured computing systems, as described in greater detail with respect to FIG. 10 and elsewhere.

FIG. 6 further illustrates one or more networks 1190, and various client computing systems 1160 via which clients of the configurable workflow service 1110 may interact with the service 1110 to define and execute workflows. The network(s) 1190 of FIG. 6 may include any appropriate network or combination of networks, including an intranet, the Internet, one or more private networks with access to and/or from the Internet, a cellular network, a local area network, or any other such network or combination thereof. Communications over the networks may be enabled by wired or wireless connections and combinations thereof.

In some embodiments, the configurable workflow service 1110 may provide one or both of a GUI (not shown) and/or an API (not shown), such as to enable clients to perform various interactions with the service 1110. For example, a user representative (not shown) of a particular client may locally interact with one of the client computing systems 1160 to cause further interactions to occur with the configurable workflow service 1110 over the network(s) 1190. The user may, for example, interact with a workflow editor module 1120 of the configurable workflow service, via which the user may define one or more workflows of interest for the client. As part of the interactions with the user, the configurable workflow service 1110 may store various client information 1112 regarding the client and optionally the user representative, and may store a particular definition of a newly defined workflow for the client as part of information 1114. In some embodiments, the defining of a particular workflow may include actions by the user in selecting one or more defined workflow components and specifying the interactions between those workflow components, such as by using one or more predefined system-provided workflow component definitions 1116. In other embodiments, the configurable workflow service 1110 may not provide any such system-provided predefined workflow components. As part of defining a new workflow, the user may further specify one or more source locations at which source data is to be retrieved and used for the workflow definition, and one or more destination locations to which data that is produced by the defined workflow will be provided. The various information 1112, 1114, and 1116 used by the configurable workflow service 1110 may further be stored on one or more systems that support or provide the configurable workflow service 110, such as a database of the configurable workflow service, although such systems are not illustrated with respect to FIG. 6.

In addition, the user representative of the client may optionally in some embodiments define one or more new workflow components as part of defining a new workflow, and if so, such client-defined workflow components may further have definition information stored in information 1116 in at least some embodiments. While a client-defined workflow and any client-defined workflow components may in some embodiments be treated as private unless otherwise specified by the client (e.g., to be accessible or otherwise visible only to that client unless other specified), in other embodiments and situations, at least some such client-specific information may instead be made available to other clients in specified circumstances, such as to enable other clients to use some or all of the client's defined workflow components and/or workflows (e.g., for a fee or for other benefits provided to the client who defined such information, if the client who defined such information approves use by others, etc.). In a similar manner, source data used by a client's defined workflow and final output data produced by a client's defined workflow may in at least some embodiments be treated as private to that client unless otherwise specified, although in other embodiments some or all such source data and/or final output data may instead be made available to other clients in specified circumstances (e.g., for a fee or for other benefit to the client with which that data is associated, if the client associated with such information approves use by others, etc.).

When a client indicates one or more storage locations from which source data may be obtained and/or to which final output data may be provided for a defined workflow, such storage locations may have various forms in various embodiments, as discussed in greater detail elsewhere. As one example, in at least some embodiments, the configurable workflow service may be integrated with or otherwise affiliated with one or more particular optional online storage services 1145, such as to form a single system 1105 (e.g., a single system that is operated by a single entity). If so, interactions 1147 with such optional online storage services 1145 may be performed to retrieve source data and/or to store final output data. Furthermore, in at least some embodiment, intermediate data results that are generated during execution of a workflow may similarly be stored in such online storage services 1145, such as to be produced by a first part of the defined workflow and to be later accessed and used by a second defined part of the workflow, whether in addition to or instead of one or more optional storage nodes 1150. Moreover, in at least some embodiments and situations, one or more online storage services 1170 are available over the network 1190 to the client computing system 1160 and to the configurable workflow service 1110, and may be used in a similar manner over the network(s) 1190, whether in addition to or instead of some or all of the optional online storage services 1145. In addition, in at least some embodiments and situations, a particular client may provide one or more client-specific storage systems or other storage locations using one or more other computing systems 1185, which may similarly be used over the network(s) 1190.

After a client has interacted with the configurable workflow service to define a workflow, the client may further interact with a workflow engine module 1130 of the configurable workflow service to initiate execution of the defined workflow. The execution of a particular workflow may be initiated in various manners, such as to be performed immediately upon a corresponding instruction from the client, to occur at a specified future time or when other specified criteria (such as for one or more defined preconditions) are satisfied that will initiate execution of the workflow, etc. As with the workflow editor module 1120, the workflow engine module 1130 may in some embodiments provide a GUI interface and/or and API interface for use by clients. When the execution of a defined workflow is initiated, the workflow engine module 1130 in the example embodiment retrieves workflow definition information for that defined workflow from the information 1114, and initiates the execution of the defined workflow on one or more computing nodes. In particular, the workflow definition may be constructed with various logical nodes that each correspond to defined operations and are interconnected in various manners, and the workflow engine module 1130 may select particular computing nodes to use to perform particular such operations, as well as to further perform activities to provision and initiate execution of corresponding workflow worker processes on each such selected computing node. As part of provisioning such computing nodes and/or of executing workflow worker processes on the computing nodes, additional interactions with one or more storage locations may be performed to obtain input data to be used and/or to store results data that are produced, including for intermediate results data for use by other workflow worker processes of the defined workflow.

Some or all of the computing nodes used to implement a defined workflow may, for example, be selected from optional computing nodes 1140 provided by the configurable workflow service 1110, if present, and workflow worker processes 1142 may be executed on those computing nodes to implement the defined operations. In other embodiments, the workflow engine module 1130 may use computing nodes that are not provided by the configurable workflow surface 1110, whether instead of or in addition to the optional computing nodes 1140. For example, in some embodiments and situations, a particular client may provide or otherwise control one or more other computing systems 1185, and the workflow engine 1130 may configure and use such other computing systems 1185 as computing nodes for use in executing that client's defined workflow. In addition, in some embodiments, one or more online program execution services 1148 and/or 1175 may be available for use in executing programs in various manners, and if so may be used to provide computing nodes (not shown) to execute some or all of a particular client's defined workflow. For example, the workflow engine module 1130 may provision and initiate execution of particular workflow worker processes on particular computing nodes provided by such online program execution services. As one example, in at least some embodiments, the configurable workflow service may be integrated with or otherwise affiliated with one or more particular optional online program execution services 1148 (whether in addition to or instead of one or more optional storage services 1145), such as part of a single system 1105 as described above. If so, interactions 1149 with such optional online program execution services 1148 may be performed to provision computing nodes, initiate execution of particular workflow components, receive output data produced by particular workflow components, etc.

In other embodiments, the configurable workflow service 1110 may perform additional techniques, such as to generate and provide particular types of source data for defined workflows, to perform additional activities with respect to managing final output data produced by clients' defined workflows, etc. In addition, the configurable workflow service 1110 may be implemented in some embodiments based on software instructions that execute on one or more server computing systems to program or otherwise configure the server computing system(s) to perform some or all of the described techniques, such as to program one or more hardware CPU processors (not shown) of the server computing system(s). Such software instructions may, for example, be used to implement the modules 1120 and/or 1130, or instead the functionality of the configurable workflow service may be provided using other types of modules.

In this manner, the configurable workflow service 1110 provides various benefits to various external clients, including to enable the clients to define workflows that may be executed using computing and storage resources of the configurable workflow service 1110 in part or in whole, to interact with various types of online data sources to obtain data to be manipulated, and to provide output data that is produced for storage or other use. Additional details related to particular operations of the configurable workflow service 1110 are included elsewhere herein.

Although the foregoing example embodiment of FIG. 6 is described with respect to a configurable workflow service 1110 that provides various types of functionality in conjunction with one or more client systems that each may have one or more associated users, it will be appreciated that various other embodiments may exist. For example, in at least some embodiments and situations, a client may represent an organization or other group (e.g., a company that has multiple people instead of an individual person). Thus, a client entity may have various forms in various embodiments.

In some embodiments, the configurable workflow service 1110 and optionally any online storage services and/or online program execution services that are used may each operate according to one or more fee-based structures or agreements. For example, access to some or all of the described techniques from the configurable workflow service 1110 may in some embodiments be provided in a fee-based or other paid manner to a provider or operator of the configurable workflow service 1110 and/or to at least some client systems that use described techniques of the configurable workflow service 1110. As one example, clients of the configurable workflow service 1110 may pay one-time fees, periodic (e.g., monthly) fees, and/or one or more types of usage-based fees to use functionality provided by the configurable workflow service 1110. Such fees may be based on one or more factors and activities, such as indicated in the following non-exclusive list: based on a quantity and/or type of interactions performed to define a particular workflow; a size and/or type of a defined workflow and/or of some or all of its defined workflow components; based on usage of a defined workflow, such as a measure of computing resources used in executing a defined workflow (e.g., a quantity of computing nodes used), a measure of processor capability used (e.g., CPU cycles), an amount of time that occurs during the execution of the defined workflow, activities in provisioning computing nodes for a defined workflow, amount of time during which computing nodes that are provisioned for a defined workflow are unavailable for other use, such as while those computing nodes wait for source data to be available or other preconditions to be satisfied, based on a quantity of data that is stored and/or transferred, such as based on a size of the data, an amount of time of the storage, etc.; based on content or other characteristics of particular data groups that are stored, manipulated and/or produced; etc.

Figure 7B:
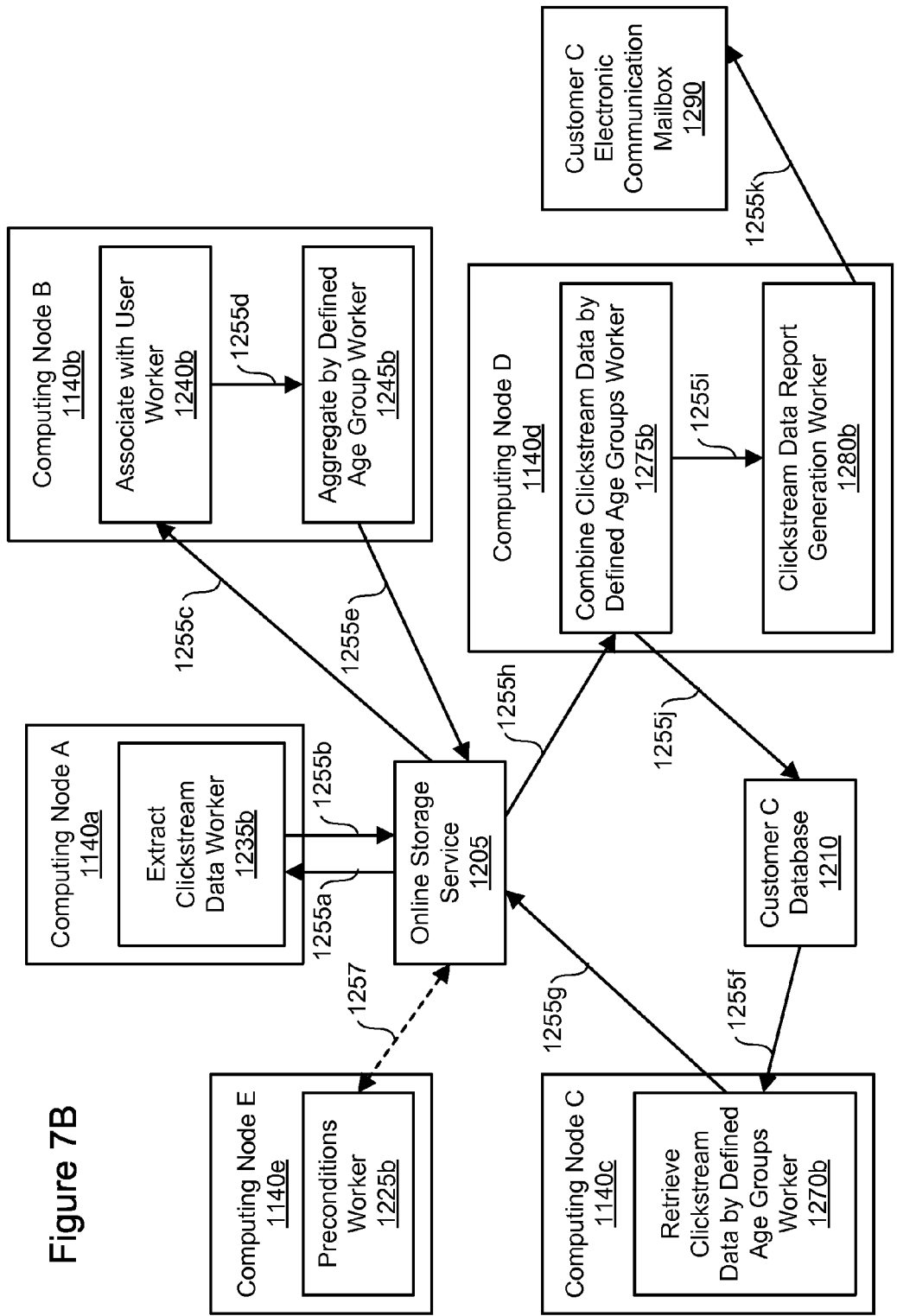

FIGS. 7A and 7B illustrate examples of defining and executing a workflow for a client in particular manners in particular situations. In particular, in the examples of FIGS. 7A and 7B, a client has access to Weblog data (such as from a Web site operated by the client, or instead in other manners), and desires to analyze that data to determine information of interest. In particular, in this example, the client desires to perform periodic (e.g., every three hours) analysis of the Weblog data in order to identify clickstream data of particular users of the Web site, and to aggregate that clickstream data in one or more manners (e.g., to determine aggregate information for particular defined age groups of the users of the Web sites). After the clickstream data is aggregated in the defined manners, it may further be used in various manners, including to be stored in a database of the client for later use, as well as to be used to generate one or more reports that are provided to the client via one or more electronic communications.

In particular, with respect to FIG. 7A, a particular client of the configurable workflow service (referred to in this example as "Customer C") has defined a new workflow that includes various nodes and interconnections, such as based on various interactions with a workflow editor module of the configurable workflow service, or instead by performing one or more programmatic interactions with a defined API of the configurable workflow service to provide information about the defined workflow in a defined manner (e.g., by uploading a file or otherwise specifying one or more data structures to represent the defined workflow). In this example, the defined workflow is represented with a logical graph 1200 that includes various nodes.

In FIG. 7A, the Customer C has defined two data source nodes 1220 to represent two types of sources of data for the defined workflow. The first data source 1220a corresponds to the Weblog data that becomes available periodically, which in this example is stored by an online storage service 1205. In particular, in this example the online storage service 1205 stores various data groups 1206 and 1207 (e.g., files), and the node 1220a that corresponds to the Weblog data source includes information to use to select one or more particular data groups 1207 from the online storage service that represent the Weblog data for the client. The node 1220a may include various criteria to use to identify particular data groups 1207, such as a file name or other metadata associated with a particular data group, one or more specified criteria with respect to content of the data groups 1207 (e.g., a time frame corresponding to Weblog data to be used to extract records from a database that correspond to a time period of interest), etc. The node 1220a may further include various access information to be used to obtain the data groups 1207 from the online storage service 1205, such as account information or other access information for Customer C at the online storage service with which the data groups 1207 are associated. In addition, in this example the Customer C has defined one or more preconditions as part of node 1225a that are associated with the data source node 1220a, such as to indicate that the execution of node 1220a and then the rest of the workflow is to begin when the data groups 1207 that satisfy the specified criteria for the node 1220a are available. In other embodiments, the preconditions 1225a or other configuration information for the execution of the defined workflow may have other forms, such as to indicate that the workflow is to be executed at a particular time, or after a particular amount of time has passed since the last execution of the defined workflow. Thus, the preconditions 1225a may, for example, be implemented in a worker process that interacts with the online storage service 1205 to determine when the data groups 1207 are available, and then initiates execution of a worker process corresponding to node 1220a. In at least some embodiments, the configurable workflow service may wait to implement some or all nodes of the workflow 1200 other than a precondition node 1225a until those preconditions are satisfied, such as to provision a computing node to execute the worker process corresponding to node 1220a after the preconditions have been satisfied.

In addition to the Weblog data source node 1220a, the Customer C has also defined a data source node 1220b that corresponds to a database of the client, such as may be stored on one or more storage systems (not shown) under control of the client or instead that are available via an online database storage service (not shown). In this example, the database 1210 of the Customer C includes various data groups 1211 and 1212 (e.g., database records), with the data groups 1212 storing clickstream data that has been previously generated for the Web site of the client, whether by previous executions of this or a similar workflow, or instead in other manners. In this example, the node 1220b does not include any defined preconditions, such as based on the database data being known to be present, or instead based on the database data being optional for the execution of the defined workflow (e.g., so that the current Weblog data will be added to and aggregated with any previously stored clickstream data, but will generate new clickstream data to be stored even if such existing clickstream data does not exist).

In addition to the data source nodes 1220, the Customer C has further defined various data manipulation nodes 1235a-1280a that are part of the defined workflow. The defined nodes 1235a-1280a of the workflow each specify one or more data manipulation operations to be performed on specified source data, and to perform particular activities with the results of those defined data manipulation operations. In particular, in this example the Customer C has defined a first node 1235a that is interconnected with the data source node 1220a, with the node 1235a being configured to perform data manipulation operations that involve extracting clickstream data for various users from the Weblog data that is provided by the data source node 1220a. As discussed in greater detail elsewhere, the data manipulation operations may be specified in various manners, including with particular program code to be executed, database operations to be performed (e.g., specified in SQL or in another defined database manipulation format), via use of defined mathematical or scientific libraries or functions, etc. Furthermore, particular data manipulation operations may be specified in other manners in other embodiments, such as to combine some or all of the defined nodes 1235a-1280a in a fewer number of nodes (e.g., one), and/or to separate the data transformation operations of node 1235a into multiple distinct nodes.

In this example, after the data manipulation node 1235a performs its data manipulation operations, the intermediate results of those data manipulation operations are configured to be provided to a next data manipulation node 1240a, which in this example is configured to associate each group of clickstream data that is extracted by node 1235a with a particular user. For example, the clickstream data provided by node 1235a may be grouped and associated with a unique identifier for each user, but may lack further identifying information about the corresponding users. The data manipulation operations of node 1240*a* may include identifying particular users, and determining corresponding information for those users. For example, an age of each user may be obtained and used in node 1240*a* to be associated with the user's corresponding clickstream data that was extracted in block 1235*a*. Accordingly, the intermediate results output data from block 1240*a* includes a group of clickstream data corresponding to particular users that are identified by age, and are configured in this example embodiment to be provided a next data manipulation node 1245*a* that is defined for the workflow. While not illustrated in this example, the data manipulation node 1240*a* may further in some embodiments obtain user-related data from another data source node (not shown) to enable its operations, such as from one of the illustrated source locations 1205 or 1210, or instead from a different source location (not shown).

The data manipulation node 1245*a* is defined in this example embodiment to aggregate the various clickstream data and associated users from node 1240*a* by defined groups of ages, such as to aggregate clickstream data for users in age groups 18-25, 26-50, 51-65, and 66+. Thus, the intermediate results from the data manipulation operations of node 1245*a* may include summary information for one or more clickstream measures for each defined age group, such as number of pages viewed, amount of time spent per page or per site, particular types of activities performed, etc. These intermediate data results produced by the node 1245*a* are configured in the illustrated example to be provided to a data manipulation node 1275*a* that combines this new clickstream data with other preexisting clickstream data if available.

In addition, while the nodes of the defined workflow are illustrated in the example of FIG. 7A in a logical manner that shows interconnections between the nodes in an abstract manner, in some embodiments, the defined workflow may further include additional details about how the implementation of the defined workflow is to occur during execution. For example, some or all of the nodes of the defined workflow may include details about particular storage locations from which to obtain the data that the node is to use, and/or particular storage locations in which the results of the node are to be stored. Thus, with respect to data manipulation node 1245*a*, the node may further be defined to optionally store the intermediate data results that it produces in a particular specified storage location, which is illustrated in FIG. 7A as optional intermediate storage 1250. Such intermediate storage 1250 may, for example, correspond to one or more of optional storage nodes 1150 of FIG. 6, optional online storage services 1145 of FIG. 6, online storage services 1170 of FIG. 6, etc. As one specific example, the intermediate storage 1250 may be the online storage service 1205, and the node 1245*a* may be configured to store its results as one or more particular data groups 1208 (not shown) on the online storage service, such as by specifying a particular data group name or other storage location of the online storage service in which the intermediate results from node 1245*a* will be stored. In a similar manner, if such an intermediate storage location is specified for node 1245*a*, the next node 1275*a* in the node graph may include a defined input storage location that is that same storage location from which to obtain those intermediate data results produced by the node 1245*a*. Additional details of the user of such intermediate storage locations are described in further detail with respect to the example of FIG. 7B. In other embodiments, the configurable workflow service may manage the transfer of data between workflow components, whether by using one or more intermediate storage locations that are automatically selected by the configurable workflow service, by performing message passing, etc.

In addition, as previously noted, the Customer C has in this example previously generated data groups 1212 on the database 1210 that correspond to previously existing clickstream data for the client. Such clickstream data may, for example, include some or all of the types of clickstream data that is aggregated with respect to node 1245*a*, and may further include various other types of clickstream data that does not correspond to node 1245*a*, such as with respect to other data groups 1211 of the database 1210. In addition, the data source node 1220*b* was previously defined to extract those data groups 1212 that correspond to the clickstream data of interest for this defined workflow. Accordingly, the Customer C further defines a data manipulation node 1270*a* that is configured to receive those data groups 1212 from the clickstream data source node 1220*b*, and to retrieve particular clickstream data of interest corresponding to the defined age groups and types of clickstream data of node 1245*a*. The data manipulation operations of node 1270*a* may include, for example, extracting particular data records from the database 1210, or may include additional types of operations (e.g., performing one or more database join operations to combine data from multiple database tables of the database, performing one or more database select operations to select a subset of data from a database table, etc.). Thus, the intermediate results provided by the data manipulation of node 1270*a* include the same types of clickstream data and the same types of defined age groups as were previously noted with respect to node 1245*a*. In other embodiments, one or more of the nodes 1235*a*-245*a* may instead manipulate the new clickstream data to match the database record structure of the data groups 1212.

Thus, the data manipulation node 1275*a* is configured to receive intermediate data results that are produced by node 1245*a*, and is further configured to receive intermediate data results produced by node 1270*a*. When both types of data are available, the node 1275*a* is configured to combine the clickstream data of the defined types by the defined age groups. The intermediate data results produced by the node 1275*a* are then configured to be used in two distinct manners in this example. In particular, the Customer C has further defined two data destination nodes 1230 that correspond to two defined destinations to which the data produced by the defined workflow will be provided. In particular, a first data destination node 1230*a* is defined to correspond to the database 1210 of the Customer C, and in particular to correspond to the same set of data groups 1212 as does the data source node 1220*b*. Thus, when the intermediate data results of node 1275*a* are produced and made available to the data destination node 1230*a*, those data results are configured to be sent to the database 1210 as final output of the defined workflow, and to be stored as part of the data groups 1212, such as by adding additional data records to the database to supplement the previously existing data that was retrieved by node 1220*b*, or to instead replace some or all of the previously retrieved data with new updated data that further includes the information from the most recent set of Weblog data.

In addition to storing the updated clickstream data in the database 1210, the Customer C further defines a data destination node 1230*b* that corresponds to communicating a generated report to the Customer C via one or more electronic communications sent to a mailbox 1290 of the Customer C. Thus, the defined workflow 1200 further includes a data manipulation node 1280*a* that is defined to take the intermediate results from the node 1275*a* and to perform data manipulation operations that include generating a report in a defined manner that includes some or all of the clickstream data from node 1275*a* (e.g., optionally just the new clickstream data output by node 1245*a*). The intermediate data results generated by the node 1280*a*, which in this example are configured to include one or more defined reports that present information in a structured manner, are provided to the data destination node 1230*b*, which is configured to provide that final output of the defined workflow 1200 to the mailbox 1290 of the Customer C via one or more electronic communications.

Thus, in the illustrated example of FIG. 7A, the Customer C client of the configurable workflow service has defined a workflow 1200 that, when implemented, combines data of different types from different sources to produce multiple types of output data of interest to the client, which is automatically made available to the client in multiple specified manners.

FIG. 7B continues the example of FIG. 7A, and in particular provides additional details related to an example implementation of the defined workflow 1200 of FIG. 7A. In particular, FIG. 7B illustrates various computing nodes 1140 that have been configured to perform various workflow worker processes 1225*b*-1280*b* that correspond to the logical nodes 1225*a*-1238*a* of the defined workflow graph 1200.

As discussed in greater detail elsewhere, the computing nodes 1140 may come from one or more sources, including by using one or more computing nodes provided by the configurable workflow service, by using one or more computing nodes made available by the Customer C client, and/or by using one or more computing nodes provided by each of one or more external online execution services. When accessing computing nodes made available by the Customer C client, the configurable workflow service may optionally use access information supplied by the Customer C client to enable interactions with those computing nodes (e.g., to provision the computing nodes, to execute software on the computing nodes, etc.). When accessing computing nodes from an external online execution service for use on behalf of the client, the configurable workflow service may in some embodiments and situations use information for the client as part of interactions with the online execution service, such as information for an existing account of the client with the online execution service. If so, the computing nodes from the online execution service that are being used by the configurable workflow service may in at least some such situations also be accessible to the client via interactions between the client and the configurable workflow service. Alternatively, when accessing computing nodes from an external online execution service for use on behalf of the client, the configurable workflow service may in some embodiments and situations use an account of the configurable workflow service with the online execution service, such that the online execution service considers those computing nodes to be associated with the configurable workflow service rather than the client. If so, those computing nodes from the online execution service that are being used by the configurable workflow service on behalf of the client may in at least some such situations not be accessible (or possibly even visible) to the client, including based on any interactions between the client and the configurable workflow service.

FIG. 7B includes the online storage service 1205 of FIG. 7A, although it does not illustrate details about the particular data groups 1206 and 1207 that are stored by the online storage service 1205. In this example, the configurable workflow service has selected and provisioned a first computing node E 1140*e* to perform a workflow worker process 1225*b* that corresponds to the preconditions node 1225*a* of the defined workflow 1200, such as by determining whether the defined preconditions are satisfied (e.g., by performing one or more interactions 1257 to determine whether particular source data from the online storage service 1205 that corresponds to the data groups 1207 of FIG. 7A are available). When the preconditions are satisfied, the workflow worker process 1225*b* initiates the performance of a next worker process 1235*b*, such as by providing corresponding instructions (not shown) to the configurable workflow service. The configurable workflow service has further selected and provisioned a computing node A 1140*a* to perform the workflow worker process 1235*b* in this example, which corresponds to the node 1235*a* of the defined workflow 1200. In particular, the worker process 1235*b* of FIG. 7B performs one or more interactions 1255*a* to obtain source data from the online storage service 1205 that correspond to the data groups 1207 of FIG. 7A, such as by using information defined with respect to the source node 1220*a* of FIG. 7A, and in accordance with the preconditions for the node 1225*a* of the defined workflow 1200 being satisfied.

The worker processes 1225*b* and 1235*b* may in some embodiments and situations execute at different times, on different types of computing nodes (e.g., if the computing node E is provided by the configurable workflow service, and the computing node A is provided externally to the configurable workflow service), in different manners (e.g., with worker process 1225*b* executing on a single physical computing system that provides computing node E, and with worker process 1235*b* executing in a distributed manner on multiple physical computing systems that provide computing node A), etc. Thus, while a particular worker process such as worker process 1235*b* is illustrated as a single process in the example of FIG. 7B, it will be appreciated that actual worker processes may be implemented in various manners in various embodiments, including by using one or more physical computing systems to represent the computing node that executes the worker process, whether provided by the configurable workflow service or instead by one or more online program execution services that are external to the configurable workflow service.

In the illustrated example, after the worker process 1235*b* receives the source data via interactions 1255*a* and performs the data manipulation operations described with respect to node 1235*a* of FIG. 7A, the worker process 1235*b* generates intermediate data results that are stored in online storage service 1205 via one or more interactions 1225*b* with the online storage service. While the particular intermediate results are not illustrated in the example of FIG. 7B, the results may be stored in various manners, as described with respect to the intermediate storage 1250 of FIG. 7A, including in a particular storage location that is configured as part of the node 1235*a* and/or the worker process 1235*b*.

After the intermediate results have been stored via the interactions 1225*b*, a worker process 1240*b* executing on computing node B 1140*b* performs more interactions 1255*c* with the online storage service 1205 to obtain those intermediate data results for use, optionally based on the use of one or more preconditions (not shown) that are satisfied when those intermediate data results are available. In particular, in this example the configurable workflow service has selected computing node B to execute worker processes 1240*b* and 1245*b* that correspond to the nodes 1240*a* and 1245*a* of FIG. 7A, respectively. Thus, with respect to the worker process 1240*b*, the process performs one or more data manipulation operations previously described with respect to node 1240*a* of FIG. 7A. In this example, because the computing node B is executing multiple worker processes, the intermediate data results produced by the worker process 1240*b* are not stored in the online storage service 1205, but are instead passed directly via interactions 1255d to the worker 1245b, such as via in-memory access or instead via one or more other types of electronic communications. In other embodiments, the worker process 1240b may instead store such intermediate data results with the online storage service even if the next worker process 1245b in the dataflow will later retrieve and use those same intermediate data results.

In this example, the executing worker process 1245b next performs the data manipulation operations previously described with respect to node 1245a of FIG. 7A, including to use the intermediate data results produced by the worker process 1240b and to generate its own intermediate data results, which in this example are stored in the online storage service 1205 via one or more interactions 1255e. While the online storage service 1205 is used to store the intermediate data results of multiple distinct worker processes in this example, in other embodiments the intermediate data results of the various worker processes may be stored in other manners, including to store intermediate data results of different worker processes in different online storage services, or instead in other manners.

In addition to the online storage service 1205 of FIG. 7A, FIG. 7B also illustrates the database 1210 of the Customer C client, although the example data groups 1211 and 1212 of FIG. 7A are not illustrated in FIG. 7B. In this example, the configurable workflow service has further selected a computing node C 1140c to execute a worker process 1270b that corresponds to the node 1270a of the workflow 1200 of FIG. 7A. Thus, the worker process 1270b of FIG. 7B performs one or more data manipulation operations previously described with respect to node 1270a, including to perform interactions 1255f with the database 1210 to obtain the data groups 1212 defined with respect to the data source node 1220b. In this example, the worker process 1270b similarly stores its intermediate data results in the online storage service 1205 via one or more interactions 1255g, although in other embodiments may store such intermediate results in other manners.

After the intermediate data results are available from the worker processes 1245b and 1270b, a worker process 1275b of computing node D 1140d performs one or more interactions 1255h with the online storage service 1205 to obtain both of those sets of intermediate data results, and to generate corresponding combined data by performing one or more data manipulation operations previously described with respect to node 1275a of FIG. 7A. In particular, in this example the configurable workflow service has selected computing node D to execute the worker process 1275b, as well as a worker process 1280b that corresponds to node 1280a of FIG. 7A. Thus, after the worker process 1275b produces its results, the process performs one or more interactions 1255j to store those results in the database 1210, such as in a manner specified with respect to destination node 1230a of FIG. 7A. In addition, in this example, the worker process 1280b obtains those intermediate data results from worker process 1275b via one or more interactions 1255i, and generates one or more reports in the manner configured with respect to node 1280a of FIG. 6. The worker process 1280b further proceeds to perform one or more interactions 1255k to send those reports to a mailbox 1290 of Customer C, such as in a manner specified with respect to destination node 1230b of FIG. 7A.

Thus, in this manner, the logical defined workflow graph 1200 of FIG. 7A is implemented via a physical instantiation of that defined workflow using the computing nodes 1140 illustrated with respect to FIG. 7B, as well as using intermediate storage to manage the transfer of some or all intermediate data results between workflow worker processes.

It will be appreciated that the examples of FIGS. 7A and 7B are provided for illustrative purposes, and that the invention is not limited by the details discussed with respect to those examples.

Figure 8:
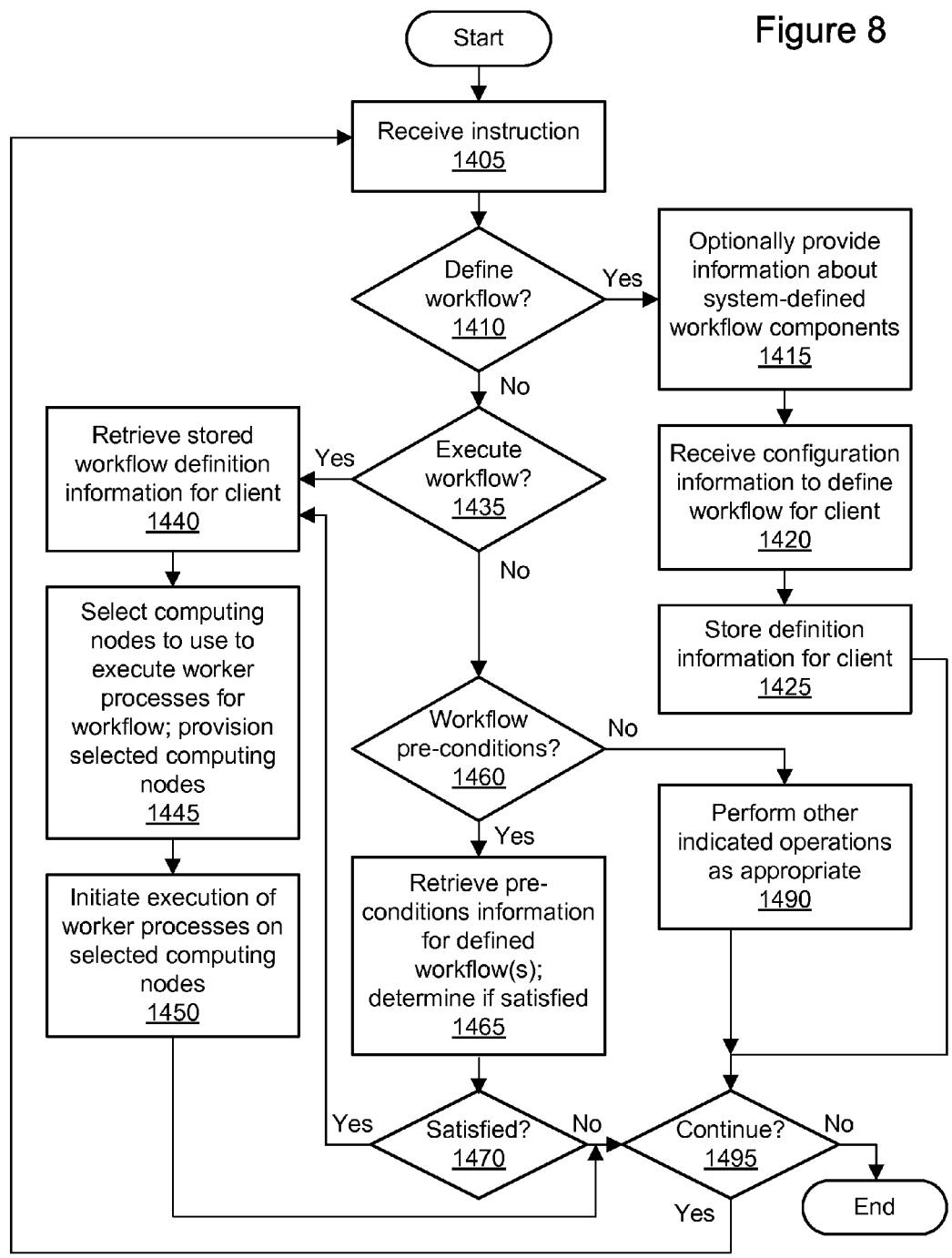
FIG. 8 illustrates an example embodiment of a flow diagram for a configurable workflow service routine, according to one embodiment.

FIG. 8 is a flow diagram of an example embodiment of a configurable workflow service routine. The routine may be provided by, for example, execution of the configurable workflow service 1110 of FIG. 6, such as to manage the definition and implementation of workflows for various remote clients of the configurable workflow service. In this example embodiment, the routine may manage accessing information from and/or providing information to one or more data storage systems or data storage services, whether external to the configurable workflow service routine, or integrated with or otherwise affiliated with the configurable workflow service routine, although the described techniques may be used in other manners in other embodiments.

In the illustrated embodiment, the routine begins at block 1405, where an instruction is received related to managing workflow-related functionality. The routine continues to block 1410 to determine if the instruction received in block 1405 is to define a new workflow on behalf of a client of the configurable workflow service. If so, the routine continues to blocks 1415-1425 to obtain and store information about a defined workflow for the client. As described in greater detail elsewhere, in some embodiments and situations, the configurable workflow service may provide a user interface via which a user representative of the client interactively specifies information for the new workflow being defined, while in other embodiments the information to use to define a new workflow may instead be received via one or more programmatic interactions from one or more executing programs on behalf of the client.

In the illustrated embodiment, the routine in block 1415 optionally provides information to the client about options for defining the new workflow, including system-defined workflow components that are available to be selected and used by the client—such information may be provided, for example, via a GUI of the configurable workflow service by displaying corresponding information and functionality to the user. After block 1415, the routine continues to block 1420 to receive configuration information to define the workflow for the client. In some embodiments, such configuration information may be received via programmatic interactions with an API of the configurable workflow service, while in other embodiments and situations, the information received in block 1420 may be provided via a user representative of the client via a user interface of the configurable workflow service. It will be appreciated that the definition of a workflow via a user interface of the configurable workflow service may involve multiple successive interactions by a user representative of the client, with the configurable workflow service optionally updating and providing additional or alternative information to the user via a user interface based on prior selections that have been made. Thus, the functionality of blocks 1415 and 1420 may include multiple iterative activities by the configurable workflow service in some embodiments and situations. After block 1420, when the definition of the new workflow has been completed, the routine continues to block 1425 to store workflow definition information for the client for later use, such as by using a database or other storage location internal to the configurable workflow service. In some embodiments, the client may further provide an instruction to initiate execution of the workflow at this time, such as may be handled with respect to blocks 1435-1450 of the routine.

Figure 9:
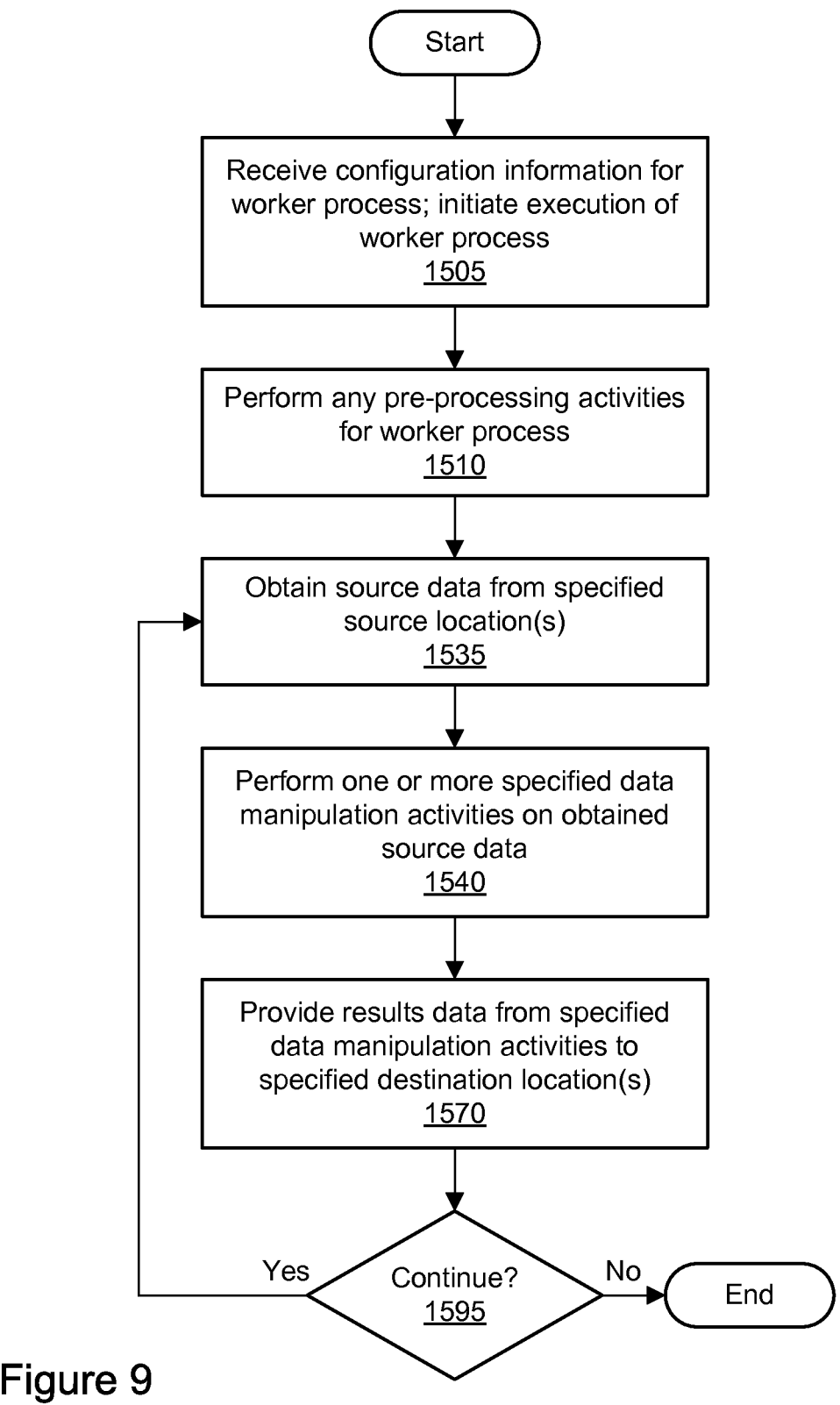
FIG. 9 illustrates an example embodiment of a flow diagram for a workflow component worker process routine, according to one embodiment.

If it is instead determined in block 1410 that the instruction received in block 1405 is not to define the new workflow, the routine continues instead to block 1435 to determine if the received instruction is to execute an existing workflow, such as an instruction received from a client to initiate current execution (e.g., with respect to a newly defined workflow, as discussed with respect to blocks 1415-1425), an indication that a scheduled time that was previously specified for such execution has arrived, etc. If so, the routine continues to block 1440 to retrieve stored workflow definition information for the client, such as from an internal database or other storage location associated with the configurable workflow service. After block 1440, the routine continues to block 1445 to select computing nodes to use to execute worker processes for the workflow, and to provision those selected computing nodes for those worker processes. As discussed in greater detail elsewhere, the computing nodes that are selected to be used may have various forms in various embodiments, including computing nodes provided by the configurable workflow service for use by the various clients of the configurable workflow service, computing nodes provided by one or more external (optionally affiliated) program execution services, computing nodes that are provided by or otherwise under the control of the client, etc. In addition, the provisioning of the selected computing nodes may include, for example, loading software to be executed for one or more particular worker processes on each selected computing node, optionally loading data to be used by such worker processes on each selected computing node, etc. After block 1445, the routine continues to block 1450 to initiate the execution of the worker processes for the workflow being executed on the selected computing nodes. FIG. 9 illustrates additional details of one example embodiment of provisioning and executing a worker process on a selected computing node.

If it is instead determined in block 1435 that the instruction received in block 1405 is not to execute a defined workflow, the routine continues instead to block 1460 to determine if the instruction received is to check preconditions for one or more defined workflows, such as for workflows that are configured to execute when their preconditions are satisfied. If so, the routine continues to block 1465 to retrieve information about preconditions for any such defined workflows, and to determine if those retrieved preconditions are currently satisfied. The routine then continues to block 1470 to determine if sufficient preconditions have been satisfied for any defined workflows to initiate their implementation, and if so returns to block 1440 to initiate execution of each such defined workflow. The instruction to check pre-conditions at a particular time may be initiated in various manners in various embodiments, such as on a periodic basis, in response to indications of events that have occurred (e.g., new arrival or availability of data), etc.

If it is instead determined at block 1460 that the instruction received in block 1405 is not to currently check workflow preconditions for any defined workflows, the routine continues instead to block 1490 to perform one or more other indicated operations as appropriate. The operations performed with respect to block 1490 may have various forms in various embodiments and at various times, including to modify or remove defined workflows for clients, stop or otherwise modify current or scheduled executions for defined workflows for clients, check for alarm conditions with respect to any defined workflows and take corresponding action as appropriate, etc.

After blocks 1425, 1450, or 1490, or if it is instead determined in block 1470 that no defined workflows have preconditions that are currently satisfied, the routine continues to block 1495 to determine whether to continue, such as until an explicit indication to terminate is received. If it is determined to continue, the routine continues to block 1405, and otherwise ends.

FIG. 9 is a flow diagram of an example embodiment of a workflow component worker process routine. The routine may be provided by, for example, execution of a configured worker process for a defined workflow on a provisioned computing node, such as with respect to the computing nodes 1140 and workflow worker processes 1142 of FIG. 6 and computing nodes 1140 and worker processes 1235*b*-1280*b* of FIG. 7B, with respect to computing nodes provided by other external program execution services and corresponding worker processes executed by those computing nodes, and/or with respect to computing nodes provided by or otherwise controlled by the client and corresponding worker processes executed by those computing nodes.

In this example embodiment of the routine, the actions of the routine are illustrated with respect to a single worker process, although it will be appreciated that a particular computing node may execute multiple worker processes in particular embodiments and situations, and that a particular worker process may in some embodiments and situations be executed on multiple computing nodes or other computing systems (e.g., in a distributed manner, such as simultaneously and/or serially on those computing systems). In addition, it will be appreciated that particular workflow component worker processes may perform different operations (e.g., more or less than are illustrated) in accordance with particular configurations for their corresponding workflow components.

The illustrated embodiment of the routine begins at block 1505, where configuration information is received for a worker process of a defined workload to be executed, and execution of the worker process is initiated. In some embodiments and situations, the configuration information and execution initiation are received based on one or more interactions with the configurable workflow routine, such as with respect to blocks 1445 and 1450 of FIG. 8. As discussed in greater detail elsewhere, each worker process may have various associated information, including to be of a defined type, to have defined software code to be executed to implement the worker process, to have one or more defined data sources from which the worker process will receive input, to have one or more defined data destinations to which data results produced by the worker process will be provided, to optionally have other data associated with the worker process (e.g., configuration information related to how the worker processes will perform one or more specified data manipulation operations), to optionally have one or more preconditions and/or post conditions, to optionally have one or more associated alarms, etc. Thus, while not illustrated with respect to the example embodiment of the workflow component worker process routine, in other embodiments, the routine may further receive additional information in block 1505 or at other times, including configuration data to be used by the worker process.

After block 1505 the routine continues to block 1510, where it optionally performs any pre-processing activities for the worker process, such as to prepare the worker process to perform its specified data manipulation operations or other operations.

After block 1510, the routine continues to block 1535, where it obtains source data to be used by the worker process from one or more specified source locations. For example, in some embodiments and situations, preconditions may be used that are based at least in part on determining availability of such source data. After block 1525, the routine continues to block 1540 to perform one or more specified data manipulation activities for the worker process on the obtained source data. As discussed in greater detail elsewhere, such specified data manipulation activities may have various forms in various embodiments and situations, including to move data from one location to another location, to modify or otherwise transform data in various manners, etc.

After block 1540, the routine continues to block 1570 to provide the results from the specified data manipulation activities of block 1540 to one or more specified destination locations. As discussed in greater detail elsewhere, such activities in providing the results data may include storing some or all of the results data in a specified storage location, sending one or more electronic communications that include some or all of the specified results data, generating a particular report or other format that includes some or all of the results data for presentation, etc.

After block 1570, the routine continues to block 1595 to determine whether to continue, such as until an explicit indication to terminate is received. If it is determined to continue, the routine returns to block 1520, and otherwise continues to block 1599 and ends. In the illustrated embodiment, a given worker process may thus perform the activities of blocks 1520-1570 multiple times if so configured, such as to perform one or more specified data manipulation activities on different groups of source data at different times, including in situations in which the computing node(s) executing the worker process are operated for extended periods of time, such as for multiple implementations of the defined workflow. In other embodiments, the worker process may further at times receive additional configuration information that modifies future performance of the worker process and/or may perform other pre-processing activities at times, and thus in such situations the routine may return from block 1595 to blocks 1505 and/or 1510 if appropriate.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Additional details are included below related to a particular example embodiment of a configurable workflow service, although it will be appreciated that the described techniques are not limited by such details.

In one embodiment, a Pipeline includes one or more objects, and each object includes one or more attributes. Attributes may have the form tag: value. Objects may have a name: attribute and type: attribute. In addition to name and type, objects may have any number of other attributes, depending on the type of the object. In the example below, an object named "Invoice Logs" describes a data object stored in an example online storage service SSS (referred to as <online-storage-service-SSS>) and has a path: attribute in addition to name: and type: attributes:

name: Invoice Logs
    type: <online-storage-service-SSS>DataNode
    path: <online-storage-service-SSS>//my_data/xyz.cvs An attribute may optionally be repeated within an object. In the example object below, input: is repeated, and the values for each input: attribute are treated as an ordered list:

name: Invoice Processing
    type: CommandRunnerTransform
    input: Invoice Logs
    input: Invoice Dimensions In one embodiment, the value of an attribute may be one of: an object reference, an expression, or a string literal. For example, for an object having name: HourPeriod and type: Schedule, the value of a period: attribute may be a string literal "1 hour". As another example, an object having name: An Object and type: MyTransform may have a dimension: attribute whose value is an object reference HourPeriod and an attrib: attribute whose value is an expression #{interval.end}.

As a further example, a Pipeline may be configured to concatenate 5 minute logs into an hourly log in online-storage-service-SSS on a recurring basis. This Pipeline may include an input Data Source (e.g., 5 minute click logs in <online-storage-service-SSS>), a copy Activity, an output Data Source (e.g., a data destination node for 1 hour click logs in <online-storage-service-SSS>), Schedule objects, and an Alarm object.

For this example Pipeline, an object with name: FiveMinPeriod may include attributes type: Schedule and period: "5 minutes". An object with name: HourPeriod may include attributes type: Schedule and period: "1 hour". An object with name: Five Minute Logs may include attributes type: <online-storage-service-SSS>DataNode, dimension: FiveMinPeriod, and path: "<online-storage-service-SSS>://prod/Clicks/#{interval.end}.csv". An object with name: Concatenate may include attributes type: CopyTransform, dimension: HourPeriod, input: Five Minute Logs, output: Hourly Logs, and on Fail: CopyFailedAlarm. An object with name: CopyFailedAlarm may include attributes type: "EmailAlarm", to: <client-email-address>, subject: "Click 5 min->1 hour Failed!", and body: "Error for interval #{node.interval.start}.#{node.interval.end}". An object with name: Hourly Logs may include attributes type: <online-storage-service-SSS>DataNode, dimension: HourPeriod, and path: "<online-storage-service-SSS>://XXX-test/OutData/#{interval.end}.csv".

For the five-minute click logs that are the input to the example Pipeline, the following two objects may define a Schedule("FiveMinPeriod") as well as a Data Source ("Five Minute Logs") that is associated with "FiveMinPeriod." An object with name: FiveMinPeriod may include attributes type: Schedule and period: "5 minutes". An object with name: Five Minute Logs may include attributes type: <online-storage-service-SSS>DataNode, dimension: FiveMinPeriod, and path: "<online-storage-service-SSS>://prod/Clicks/#{interval.end}.csv". Using these objects, a series of <online-storage-service-SSS>files may be described, such as the following examples:

<online-storage-service-SSS>://prod/Clicks/2011-11-14:10:05:00.csv
    <online-storage-service-SSS>://prod/Clicks/2011-11-14:10:10:00.csv
    <online-storage-service-SSS>://prod/Clicks/2011-11-14:10:15:00.csv <online-storage-service-SSS>://prod/Clicks/2011-11-14:
10:20:00.csv
<online-storage-service-SSS>://prod/Clicks/2011-11-14:
10:25:00.csv Each such <online-storage-service-SSS> file can be thought of as an instance of "Five Minute Logs." Each one is distinct from the others based on the time period it represents and the data it includes.

The example Pipeline may also include an object with name: Five Minute Logs that may include attributes type: <online-storage-service-SSS>DataNode, dimension: FiveMinPeriod, and path: "<online-storage-service-SSS>://prod/Clicks/#{interval.end}.csv:". The type: attribute identifies this as an <online-storage-service-SSS>DataNode source object. The name: attribute may be unique for this Pipeline definition. Data Source objects such as <online-storage-service-SSS>DataNodes may also have a dimension attribute which describes different ways in which an object can be materialized into occurrences. One common example of dimension is time period, which can be expressed as minutes, hours, days, weeks, or months. Another example dimension is one based on geographic regions, such as to correspond to different locations of data source systems.

In addition, time periods may be specified by schedule objects in this example. In particular, a schedule object that specifies a five-minute period may be defined as follows: name: FiveMinPeriod, type: Schedule, and period: "5 minutes". The dimension: attribute for the object Five Minute Logs refers to the schedule object FiveMinPeriod. In the path: attribute "<online-storage-service-SSS>://prod/Clicks/#{interval.end}.csv", the sequence '#{ }' describes an expression. In this case, the expression to be evaluated is "interval.end". Because the object Five Minute Logs has a schedule associated with it, the schedule contains an attribute called "interval", which itself has "start" and "end" values. In this way, interval.start.interval.end describes a specific time interval of a schedule, such as:

interval.start 2011-11-14:10:00:00 interval.end 2011-11-14:10:05:00
interval.start 2011-11-14:10:05:00 interval.end 2011-11-14:10:10:00
interval.start 2011-11-14:10:15:00 interval.end 2011-11-14:10:20:00

The path: attribute is evaluated as an <online-storage-service-SSS> file name using the end of each five-minute interval per the schedule object in this case.

In this example Pipeline, an activity may be defined that reads an hour's worth of five-minute clicks and concatenates them into an hourly output file. Accordingly, three objects may define a Schedule ("HourPeriod"), a CopyTransform activity ("Concatenate") that is associated with "HourPeriod", and an Alarm ("CopyFailedAlarm") that will be invoked in the event of failure. An object with name: HourPeriod may include attributes type: Schedule and period: "1 hour". An object with name: Concatenate may include attributes type: CopyTransform, dimension: HourPeriod, input: Five Minute Logs, output: Hourly Logs, and on Fail: CopyFailedAlarm. An object with name: CopyFailedAlarm may include attributes type: "EmailAlarm", to: <client-email-address>, subject: "Click 5 min->1 hour Failed!", and body: "Error for interval #{node.interval.start}.#{node.interval.end}".

The configurable workflow service may schedule and run "Concatenate" when an hour's worth of input: ("Five Minute Logs") is available. When all 20 five-minute files for a given hour are ready, each will be copied into output "Hourly Logs". If the "Concatenate" process encounters a failure condition, the Alarm object "CopyFailedAlarm" may run and generate an e-mail or other notification. In particular, "Concatenate" is an object of type "CopyTransform", which is a built-in Activity provided by the configurable workflow service in this example embodiment. The CopyTransform activity may take an input Data Source and an output Data Source. Activities may have a Schedule dimension associated with them, just like a Data Source. In this case, "Concatenate" is associated with the Schedule object "Hour Period" which describes an hourly time interval, such that "Concatenate" processes one hour's worth of data.

The Schedule of the input: in this case ("Five Minute Logs") describes a five-minute interval, while the schedule of "Concatenate" is hourly. The configurable workflow service determines that 20 five-minute input files map to the hourly interval of processing that "Concatenate" is configured for. An Alarm object such as "CopyFailedAlarm" may be associated with any number of Activities. The body: attribute in this case contains the following expression: "Error for interval #{node.interval.start}. #{node.interval.end}." In one embodiment, alarms have a node: attribute that at runtime evaluates to the object the Alarm is reporting on. In this case, the "node" would refer to the object "Concatenate" if the alarm was fired due to a failure with "Concatenate."

In this example Pipeline, an output Data Source may include an object with name: Hourly Logs, type: <online-storage-service-SSS>DataNode, dimension: HourPeriod, and path: "<online-storage-service-SSS>://prod/concat-clicks/#{interval.end}.csv".

Using these objects, a series of <online-storage-service-SSS> files may be described, such as the following examples:

<online-storage-service-SSS>//prod/concat-clicks/2011-11-14:00:0:00.csv
<online-storage-service-SSS>://prod/concat-clicks/2011-11-14:01:0:00.csv
<online-storage-service-SSS>://prod/concat-clicks/2011-11-14:02:0:00.csv Each such <online-storage-service-SSS> file can be thought of as an instance of "Hourly Logs." Each one is distinct from the others based on the time period it represents and the data it includes.

Furthermore, an object with name: Concatenate may include attributes type:

CopyTransform, dimension: HourPeriod, input: Five Minute Logs, and output: Hourly Logs. An object with name: Hourly Logs may include attributes type: <online-storage-service-SSS>DataNode, dimension: HourPeriod, and path: "<online-storage-service-SSS>://prod/concat-clicks/#{interval.end}.csv". Like the "Five Minute Logs" Data Source described above, "Hourly Logs" is associated with a Schedule, which in this case is an hourly Schedule. The path: attribute is evaluated as an <online-storage-service-SSS> file name using the end of each hourly interval per the schedule object in this case. The "Concatenate" Activity specifies 'Hourly Logs' as the output Data Source. When the configurable workflow service schedules and runs "Concatenate," it may also produce an <online-storage-service-SSS> file corresponding to the ending time range of the hourly schedule period for the current run.

The value of an attribute can take the following forms: an object reference, an expression, or a string literal. With respect to object references, an attribute can refer to another Pipeline object by name. This type of reference may be useful in forming certain types of expressions. For example, a first object may have name: object1 and type: sample. A second object may then have name: object2, type: sample, and a reference attrib1: object1.

An expression may occur within this construct: #{"'expression'"}. Expressions can be a built-in function (e.g., attrib: #{day(currentTime( )}), a string value (e.g., attrib: #{"this is a string value"}), a concatenation of string terms (e.g., attrib: #{"prefix-"+functionReturningString( )}), an integer or floating point value (e.g., attrib: #{func(3.14, 5)}), a numeric expression (e.g., attrib: #{func(3.14+5)}), a simple reference to another attribute (e.g., name: object1, type: sample, attrib1: #{today( )}, and attrib2: #{attrib1}), or a qualified reference to another attribute (e.g., a first object having name: object1, type: sample, attrib1: #{today( )}, and attrib2: attrib1 and a second object having name: object2, type: sample, an object reference attrib3: object1, and a qualified attribute reference attrib4: #{attrib3.attrib2} whose value is object1.attrib2). With respect to string literals, an attribute may have a string literal value, such as "this is a string literal". Additionally, a string literal may contain an expression that is evaluated as a string (e.g., attrib1: "This contains an #{attrib2}" and attrib2: "expression"). In one embodiment, a string literal may contain multiple lines.

Illustrative Computer System

In at least some embodiments, a computer system that implements a portion or all of one or more of the technologies described herein may include a general-purpose computer system that includes or is configured to access one or more computer-readable media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1, 3, 4, 6, 7A, and 7B, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for FIGS. 1 through 9 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computing devices configured to implement a plurality of computing resources, wherein the plurality of computing resources comprise a first data source and a second data source; and
   one or more computing devices configured to implement a configurable workflow service, wherein the configurable workflow service is operable to:
      configure a pipeline comprising a first data source node, a second data source node, and an activity node, wherein the first data source node represents first data from the first data source, wherein the second data source node represents second data from the second data source, and wherein the activity node represents a workflow activity that uses the first data and the second data as input;
      trigger a first connector represented by the first data source node and a second connector represented by the second data source node, wherein the first connector and second connector implement a common connector interface comprising a plurality of methods, wherein at least some of the plurality of methods are implemented differently by the first connector than by the second connector;
      in response to the triggering the first connector, acquire the first data at the first connector from the first data source through the connector interface;
      in response to the triggering the second connector, acquire the second data at the second connector from the second data source through the connector interface;
      send the first data from the first connector to the workflow activity through the connector interface;
      send the second data from the second connector to the workflow activity through the connector interface; and
      perform the workflow activity using the first data and the second data.

2. The system as recited in claim 1, wherein the first data is acquired from the first data source using at least one of the plurality of methods of the first connector, wherein the second data is acquired from the second data source using at least one of the plurality of methods of the second connector, wherein program code implementing the first connector differs from program code implementing the second connector.

3. The system as recited in claim 1, wherein the configurable workflow service is further operable to:
   determine the availability of the first data source or the second data source using at least one of the plurality of methods.

4. The system as recited in claim 1, wherein the configurable workflow service is further operable to:
   aggregate the first data and the second data using the workflow activity.

5. The system as recited in claim 1, wherein, in acquiring the first data at the first connector from the first data source through the connector interface, the first data is transformed from a format used by the first data source to a format used by the workflow activity.

6. A computer-implemented method, comprising:
   triggering a first connector represented by a first data source node in a workflow and triggering a second connector represented by a second data source node in the workflow, wherein the first data source node represents first data from a first data source, wherein the second data source node represents second data from a second data source, and wherein the first connector and second connector implement a connector interface comprising a plurality of methods;
   in response to the triggering the first connector, acquiring the first data at the first connector from the first data source through the connector interface;
   in response to the triggering the second connector, acquiring the second data at the second connector from the second data source through the connector interface;
   performing a workflow activity represented by the activity node, wherein the workflow activity uses the first data and the second data as input.

7. The method as recited in claim 6, wherein the first data is acquired from the first data source using at least one of the plurality of methods of the first connector, wherein the second data is acquired from the second data source using at least one of the plurality of methods of the second connector, wherein program code implementing the first connector differs from program code implementing the second connector.

8. The method as recited in claim 6, further comprising:
   determining the availability of the first data source or the second data source using at least one of the plurality of methods.

9. The method as recited in claim 6, further comprising:
   aggregating the first data and the second data at the activity node.

10. The method as recited in claim 6, further comprising:
    transforming the first data from a format used by the first data source to a format used by the workflow activity.

11. A system, comprising:
    at least one processor;
    a storage subsystem, wherein the storage subsystem comprises a first data store storing first data and a second data store storing second data; and
    a memory coupled to the at least one processor, wherein the memory stores program instructions, wherein the program instructions are executable by the at least one processor to:
       trigger a first connector represented by a data source node, wherein the data source node represents the first data from the first data store, wherein the data source node is coupled to an activity node representing a workflow activity, and wherein the first connector implements a connector interface comprising a plurality of methods;
       acquire the first data at the first connector from the first data store through the connector interface;
       send the first data from the first connector to the workflow activity through the connector interface;
       perform the workflow activity using the first data as input and producing the second data as output;
       trigger a second connector represented by the data destination node, wherein the data destination node represents the second data from the second data store, and wherein the second connector implements the connector interface;

acquire the second data at the second connector from the workflow activity through the connector interface; and send the second data from the second connector to the second data store through the connector interface.

12. The system as recited in claim 11, wherein program code implementing the first connector differs from program code implementing the second connector.

13. The system as recited in claim 11, wherein the program instructions are further executable by the at least one processor to:

determine the availability of the first data store or the second data store using at least one of the plurality of methods.

14. The system as recited in claim 11, wherein the pipeline comprises an additional data source node, wherein the additional data source node represents third data, and wherein the program instructions are further executable by the at least one processor to:

aggregate the first data and the third data.

15. The system as recited in claim 11, wherein the program instructions are further executable by the at least one processor to:

transform the first data from a format used by the first data source to a format used by the workflow activity.

16. A non-transitory, computer-readable storage medium storing program instructions computer-executable to perform:

activating a first connector represented by a first data source node in a workflow and activating a second connector represented by a second data source node in the workflow, wherein the first data source node represents first data from a first data source, wherein the second data source node represents second data from a second data source, wherein the first data source node and the second data source node are coupled to an activity node representing a workflow activity, wherein the first connector and second connector implement a connector interface comprising a plurality of methods, and wherein at least some of the plurality of methods are implemented differently by the first connector than by the second connector;

in response to activating the first connector, acquiring the first data at the first connector from the first data source through the connector interface;

in response to activating the second connector, acquiring the second data at the second connector from the second data source through the connector interface;

performing the workflow activity represented by the activity node, wherein the workflow activity uses the first data and the second data as input.

17. The non-transitory, computer-readable storage medium as recited in claim 16, wherein the first data is acquired from the first data source using at least one of the plurality of methods of the first connector, wherein the second data is acquired from the second data source using at least one of the plurality of methods of the second connector, wherein program code implementing the first connector differs from program code implementing the second connector.

18. The non-transitory, computer-readable storage medium as recited in claim 16, wherein the program instructions are further computer-executable to perform:

determining the availability of the first data source or the second data source using at least one of the plurality of methods.

19. The non-transitory, computer-readable storage medium as recited in claim 16, wherein the program instructions are further computer-executable to perform:

aggregating the first data and the second data.

20. The non-transitory, computer-readable storage medium as recited in claim 16, wherein the program instructions are further computer-executable to perform:

transforming the first data from a format used by the first data source to a format used by the workflow activity.

* * * * *